United States Patent
Shpayzer et al.

(10) Patent No.: US 12,157,782 B2
(45) Date of Patent: Dec. 3, 2024

(54) SUPPORT MATERIAL FORMULATIONS USABLE IN ADDITIVE MANUFACTURING OF THREE-DIMENSIONAL OBJECTS AT LOW TEMPERATURES

(71) Applicant: Stratasys Ltd., Rehovot (IL)

(72) Inventors: Elena Shpayzer, Rehovot (IL); Eduardo Napadensky, Natania (IL); Raffy Sarfati, Kibbutz Mishmar David (IL); Mayan Rumbak, Mazkeret Batia (IL)

(73) Assignee: Stratasys Ltd., Rehovot (IL)

( * ) Notice: Subject to any disclaimer, the term of this patent is extended or adjusted under 35 U.S.C. 154(b) by 285 days.

(21) Appl. No.: 16/959,170

(22) PCT Filed: Dec. 31, 2018

(86) PCT No.: PCT/IL2018/051419
§ 371 (c)(1),
(2) Date: Jun. 30, 2020

(87) PCT Pub. No.: WO2019/130321
PCT Pub. Date: Jul. 4, 2019

(65) Prior Publication Data
US 2020/0338834 A1    Oct. 29, 2020

Related U.S. Application Data

(60) Provisional application No. 62/612,455, filed on Dec. 31, 2017.

(51) Int. Cl.
*B29C 64/00*    (2017.01)
*B29C 64/40*    (2017.01)
(Continued)

(52) U.S. Cl.
CPC ........... *C08F 220/20* (2013.01); *B29C 64/40* (2017.08); *B33Y 30/00* (2014.12); *B33Y 70/00* (2014.12);
(Continued)

(58) Field of Classification Search
CPC .............................. C08F 220/20; B33Y 10/00
See application file for complete search history.

(56) References Cited

U.S. PATENT DOCUMENTS 5,932,625 A * 8/1999 Watanabe ................. C08F 2/48
  526/318.1
6,228,923 B1   5/2001 Lombardi et al.
(Continued)

FOREIGN PATENT DOCUMENTS

CN    103189187    7/2013
CN    105594308    5/2016
(Continued)

OTHER PUBLICATIONS

English Translation Dated Dec. 27, 2021 of Notification of Office Action and Search Report Dated Nov. 15, 2021 From the State Intellectual Property Office of the People's Republic of China Re. Application No. 201880089704.7. (7 Pages).
(Continued)

*Primary Examiner* — Nicholas R Krasnow

(57) ABSTRACT

Formulations usable as support material in additive manufacturing such as 3D inkjet printing and which feature a viscosity of no more than 50 cPs at 35° C., are provided. The formulations are composed of at least one hydrophilic curable material which provides, when hardened, a material that is dissolvable or swellable in an aqueous solution; and at least one non-curable material that is capable of being swelled by said hardened material formed of said at least one curable material. Additive manufacturing processes utilizing
(Continued)

these formulations and objects obtained thereby are also provided.

18 Claims, 7 Drawing Sheets

(51) Int. Cl.
| | |
|---|---|
| *B33Y 30/00* | (2015.01) |
| *B33Y 70/00* | (2020.01) |
| *C08F 2/50* | (2006.01) |
| *C08F 220/18* | (2006.01) |
| *C08F 220/20* | (2006.01) |
| *B29K 233/04* | (2006.01) |
| *C08F 222/10* | (2006.01) |
| *C08F 222/22* | (2006.01) |

(52) U.S. Cl.
CPC .......... *C08F 2/50* (2013.01); *C08F 220/1818* (2020.02); *B29K 2233/08* (2013.01); *C08F 220/1811* (2020.02); *C08F 222/102* (2020.02); *C08F 222/1063* (2020.02); *C08F 222/225* (2020.02)

(56) References Cited

U.S. PATENT DOCUMENTS

| | | | |
|---|---|---|---|
| 6,259,962 | B1 | 7/2001 | Gothait |
| 6,569,373 | B2* | 5/2003 | Napadensky ........... B29C 64/40 |
| | | | 264/494 |
| 6,658,314 | B1 | 12/2003 | Gothait |
| 6,850,334 | B1 | 2/2005 | Gothait |
| 7,183,335 | B2 | 2/2007 | Napadensky |
| 7,209,797 | B2 | 4/2007 | Kritchman et al. |
| 7,225,045 | B2 | 5/2007 | Gothait et al. |
| 7,255,825 | B2 | 8/2007 | Nielsen et al. |
| 7,300,619 | B2 | 11/2007 | Napadensky et al. |
| 7,479,510 | B2 | 1/2009 | Napadensky et al. |
| 7,500,846 | B2 | 3/2009 | Eshed et al. |
| 7,962,237 | B2 | 6/2011 | Kritchman |
| 9,031,680 | B2 | 5/2015 | Napadensky |
| 9,227,365 | B2 | 1/2016 | Dikovsky et al. |
| 2003/0107158 | A1 | 6/2003 | Levy |
| 2003/0207959 | A1 | 11/2003 | Napadensky et al. |
| 2004/0138326 | A1 | 7/2004 | Arnold |
| 2005/0113476 | A1* | 5/2005 | Akiyama ............. C09D 11/101 |
| | | | 522/1 |
| 2005/0159501 | A1 | 7/2005 | Kicfor-Liptak |
| 2010/0191360 | A1 | 7/2010 | Napadensky et al. |
| 2013/0040091 | A1 | 2/2013 | Dikovsky et al. |
| 2014/0138326 | A1 | 5/2014 | Boodaghians et al. |
| 2016/0208117 | A1 | 7/2016 | Loccufier et al. |
| 2016/0326387 | A1 | 11/2016 | Arita et al. |
| 2017/0173865 | A1 | 6/2017 | Dokovsky et al. |
| 2019/0119514 | A1* | 4/2019 | Yudovin-Farber ...... C08L 83/12 |
| 2020/0399411 | A1 | 12/2020 | Shpayzer et al. |

FOREIGN PATENT DOCUMENTS

| | | |
|---|---|---|
| CN | 106660266 | 5/2017 |
| CN | 107097414 | 8/2017 |
| CN | 107107461 | 8/2017 |
| CN | 107107462 | 8/2017 |
| CN | 107501477 | 12/2017 |
| EP | 3208073 | 8/2017 |
| EP | 3251818 | 12/2017 |
| EP | 3254835 | 12/2017 |
| EP | 3715094 | 9/2020 |
| JP | 2015-219371 | 12/2015 |
| JP | 2017-222049 | 12/2017 |
| JP | 2017-537178 | 12/2017 |
| WO | WO 2015/056614 | 4/2015 |
| WO | WO 2015/118552 | 8/2015 |
| WO | WO 2016/063282 | 4/2016 |
| WO | WO 2016/121587 | 8/2016 |
| WO | WO 2016/142947 | 9/2016 |
| WO | WO 2017/029657 | 2/2017 |
| WO | WO 2017/050604 | 3/2017 |
| WO | WO 2017/122211 | 7/2017 |
| WO | WO 2018/055521 | 3/2018 |
| WO | WO 2018/055522 | 3/2018 |
| WO | WO 2019/130321 | 7/2019 |
| WO | WO 2019/130323 | 7/2019 |

OTHER PUBLICATIONS

Notification of Office Action and Search Report Dated Dec. 9, 2021 From the State Intellectual Property Office of the People's Republic of China Re. Application No. 201880090526.X. (8 Pages).
Notification of Office Action and Search Report Dated Nov. 15, 2021 From the State Intellectual Property Office of the People's Republic of China Re. Application No. 201880089704.7. (10 Pages).
International Preliminary Report on Patentability Dated Jul. 9, 2020 From the International Bureau of WIPO Re. Application No. PCT/IL2018/051419. (12 Pages).
International Preliminary Report on Patentability Dated Jul. 9, 2020 From the International Bureau of WIPO Re. Application No. PCT/IL2018/051422. (11 Pages).
International Search Report and the Written Opinion Dated Apr. 8, 2019 From the International Searching Authority Re. Application No. PCT/IL2018/051419. (18 Pages).
International Search Report and the Written Opinion Dated Apr. 8, 2019 From the International Searching Authority Re. Application No. PCT/IL2018/051422. (17 Pages).
Notification of Office Action and Search Report Dated Aug. 5, 2022 From the State Intellectual Property Office of the People's Republic of China Re. Application No. 201880090526.X. (8 Pages).
Translation Dated Jan. 17, 2022 of Notification of Office Action Dated Dec. 9, 2021 From the China National Intellectual Property Administration Re. Application No. 201880090526.X. (4 Pages).
Communication Pursuant to Article 94(3) EPC Dated Jun. 30, 2022 From the European Patent Office Re. Application No. 18836918.5. (7 Pages).
English Translation Dated Aug. 21, 2022 of Notification of Office Action and Search Report Dated Aug. 5, 2022 From the State Intellectual Property Office of the People's Republic of China Re. Application No. 201880090526.X. (6 Pages).
Restriction Official Action Dated Jun. 15, 2022 From the US Patent and Trademark Office Re. U.S. Appl. No. 16/959,183. (8 Pages).
Office Action Dated Dec. 19, 2022 From the Israel Patent Office Re. Application No. 275770. (4 Pages).
Official Action Dated Sep. 21, 2022 From the US Patent and Trademark Office Re. U.S. Appl. No. 16/959,183. (36 Pages).
Zioga et al. "Characteristic ratio of poly(tetrahydrofurfuryl acrylate) and poly(2-ethylbutyl acrylate)", Journal of Polymer Science part B: Polymer Physics 35(10): 1589-1592, 1997.
Notice of Reason(s) for Rejection Dated Nov. 1, 2022 From the Japan Patent Office Re. Application No. 2020-536771.and its Translation Into English.
Notification of Office Action and Search Report Dated Oct. 10, 2022 From the State Intellectual Property Office of the People's Republic of China Re. Application No. 201880089704.7 and Its Translation Into English. (9 Pages).
Office Action Dated Nov. 28, 2022 From the Israel Patent Office Re. Application No. 275769. (5 Pages).
Decision on Rejection Dated Feb. 28, 2023 From the State Intellectual Property Office of the People's Republic of China Re. Application No. 2020-536771 and Its Translation Into English. (5 Pages).
Official Action Dated May 3, 2024 from the US Patent and Trademark Office Re. U.S. Appl. No. 16/959,183. (12 pages).
Notice of Reason for Rejection Dated Jul. 12, 2024 From the Japan Patent Office Re. Application No. 2023-106760 and Its Translation Into English. (11 Pages).

(56) References Cited

OTHER PUBLICATIONS

Notice of Reason for Rejection Dated Aug. 12, 2022 From the Japan Patent Office Re. Application No. 2020-536767 and Its Translation Into English. (11 Pages).
Communication Pursuant to Article 94(3) EPC Dated Apr. 18, 2023 From the European Patent Office Re. Application No. 18836535.7 (8 Pages).
Official Action Dated Apr. 21, 2023 from the US Patent and Trademark Office Re. U.S. Appl. No. 16/959,183. (24 pages).
Official Action Dated Jan. 3, 2024 from the US Patent and Trademark Office Re. U.S. Appl. No. 16/959,183. (18 pages).
Notice of Reason for Rejection Dated Mar. 3, 2023 From the Japan Patent Office Re. Application No. 2020-536767 and its Translation Into English. (8 Pages).

* cited by examiner

SUPPORT MATERIAL FORMULATIONS USABLE IN ADDITIVE MANUFACTURING OF THREE-DIMENSIONAL OBJECTS AT LOW TEMPERATURES

RELATED APPLICATIONS

This application is a National Phase of PCT Patent Application No. PCT/IL2018/051419 having International filing date of Dec. 31, 2018, which claims the benefit of priority under 35 USC § 119 (e) of U.S. Provisional Patent Application No. 62/612,455, filed on Dec. 31, 2017. The contents of the above applications are all incorporated by reference as if fully set forth in their entirety.

PCT Patent Application No. PCT/IL2018/051419 is also related to U.S. Provisional Patent Application No. 62/612,466, filed on Dec. 31, 2017. The contents of the above applications are all incorporated by reference as if fully set forth herein in their entirety.

PCT Patent Application No. PCT/IL2018/051419 is also related to PCT Patent Application No. PCT/IL2018/051422 filed on Dec. 31, 2018 entitled "MODELING MATERIAL FORMULATIONS USABLE IN ADDITIVE MANUFACTURING OF THREE-DIMENSIONAL OBJECTS AT LOW TEMPERATURES". The contents of the above applications are all incorporated by reference as if fully set forth in their entirety.

FIELD AND BACKGROUND OF THE INVENTION

The present invention, in some embodiments thereof, relates to additive manufacturing and, more particularly, but not exclusively, to support material formulations usable in additive manufacturing processes performed at low working temperatures (e.g., lower than 50° C.). Additive manufacturing is generally a process in which a three-dimensional (3D) object is manufactured utilizing a computer model of the objects. Such a process is used in various fields, such as design related fields for purposes of visualization, demonstration and mechanical prototyping, as well as for rapid manufacturing (RM).

The basic operation of any AM system consists of slicing a three-dimensional computer model into thin cross sections, translating the result into two-dimensional position data and feeding the data to control equipment which manufacture a three-dimensional structure in a layerwise manner.

Various AM technologies exist, amongst which are stereolithography, digital light processing (DLP), and three dimensional (3D) printing, 3D inkjet printing in particular. Such techniques are generally performed by layer by layer deposition and solidification of one or more building materials, typically photopolymerizable (photocurable) materials.

In three-dimensional printing processes, for example, a building material is dispensed from a print head having a set of nozzles to deposit layers on a supporting structure. Depending on the building material, the layers may then solidify, harden or cured, optionally using a suitable device.

Various three-dimensional printing techniques exist and are disclosed in, e.g., U.S. Pat. Nos. 6,259,962, 6,569,373, 6,658,314, 6,850,334, 7,183,335, 7,209,797, 7,225,045, 7,300,619, 7,479,510, 7,500,846, 7,962,237 and 9,031,680, all of the same Assignee, the contents of which are hereby incorporated by reference.

A printing system utilized in additive manufacturing may include a receiving medium and one or more print heads. The receiving medium can be, for example, a fabrication tray that may include a horizontal surface to carry the material dispensed from the print head. The print head may be, for example, an ink jet head having a plurality of dispensing nozzles arranged in an array of one or more rows along the longitudinal axis of the print head. The print head may be located such that its longitudinal axis is substantially parallel to the indexing direction. He printing system may further include a controller, such as a microprocessor to control the printing process, including the movement of the print head according to a pre-defined scanning plan (e.g., a CAD configuration converted to a Stereo Lithography (STL) format and programmed into the controller). The print head may include a plurality of jetting nozzles. The jetting nozzles dispense material onto the receiving medium to create the layers representing cross sections of a 3D object.

In addition to the print head, there may be a source of curing energy, for curing the dispensed building material. The curing energy is typically radiation, for example, UV radiation.

Additionally, the printing system may include a leveling device for leveling and/or establishing the height of each layer after deposition and at least partial solidification, prior to the deposition of a subsequent layer.

The building materials may include modeling materials and support materials, which form the object and the temporary support constructions supporting the object as it is being built, respectively.

The modeling material (which may include one or more material(s)) is deposited to produce the desired object/s and the support material (which may include one or more material(s)) is used, with or without modeling material elements, to provide support structures for specific areas of the object during building and assure adequate vertical placement of subsequent object layers, e.g., in cases where objects include overhanging features or shapes such as curved geometries, negative angles, voids, and so on.

Both the modeling and support materials are preferably liquid at the working temperature at which they are dispensed, and subsequently harden or solidify, typically upon exposure to curing condition, typically curing energy (e.g., UV curing), to form the required layer shape. After printing completion, support structures are removed to reveal the final shape of the fabricated 3D object.

Known methods for removal of support materials include mechanical impact, which is typically applied by a tool or water-jet, as well as chemical methods, such as dissolution in a solvent, with or without heating. The mechanical methods are labor, intensive and are often unsuited for small intricate parts.

For dissolving the support materials, the fabricated object is often immersed in water or in a solvent that is capable of dissolving the support materials. The solutions utilized for dissolving the support material are also referred to herein and in the art as "cleaning solutions". In many cases, however, the support removal process may involve hazardous materials, manual labor and/or special equipment requiring trained personnel, protective clothing and expensive waste disposal. In addition, the dissolution process is usually limited by diffusion kinetics and may require very long periods of time, especially when the support constructions are large and bulky. Furthermore, post-processing may be necessary to remove traces of a 'mix layer' on object surfaces. The term "mix layer" refers to a residual layer of mixed hardened model and support materials formed at the interface between the two materials on the surfaces of the object being fabricated, by model and support materials mixing into each other at the interface between them.

Both mechanical and dissolution methods for removal of support materials are especially problematic for use in an office environment, where ease-of-use, cleanliness and environmental safety are major considerations.

Water-soluble materials for 3D printing have been previously described. U.S. Pat. No. 6,228,923, for example, describes a water soluble thermoplastic polymer—Poly(2-ethyl-2-oxazoline)—for use as a support material in a 3D building process involving high pressure and high temperature extrusion of ribbons of selected materials onto a plate.

A water-containing support material comprising a fusible crystal hydrate is described in U.S. Pat. No. 7,255,825.

Compositions suitable for support in building a 3D object are described, for example, in U.S. Pat. Nos. 7,479,510, 7,183,335 and 6,569,373, all to the present Assignee. Generally, the compositions disclosed in these patents comprise at least one UV curable (reactive) component, e.g., an acrylic component, at least one non-UV curable component, e.g. a polyol or glycol component, and a photoinitiator. After irradiation, these compositions provide a semi-solid or gel-like material capable of dissolving upon exposure to water, to an alkaline or acidic solution or to a water detergent solution. 3D printing methodologies using such a soluble support material are also known as "Soluble Support Technology" or SST, and the support material formulation is often referred to a "soluble support material" or "soluble support material formulation". Soluble support materials should beneficially feature sufficient water solubility, so as to be removed during a relatively short time period, or sufficient solubility in a non-hazardous cleaning solution, yet, at the same, to exhibit mechanical properties sufficient to support the printed object during the additive manufacturing process.

In order to be compatible with most of the commercially-available print heads utilized in a 3D inkjet printing system, the uncured building material should feature the following characteristics: a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring boiling point lower than 200° C. or lower than 190° C., yet characterized preferably by low evaporation rate at the working (e.g., jetting) temperature, and, if the building material includes solid particles, these should feature an average size of no more than 2 microns.

Most of the currently available formulations usable in inkjet printing feature the required viscosity (e.g., from 8 to 25 cps) at a working (e.g., jetting) temperature of 50-90° C. These formulations are not suitable for applications that require low temperature of, for example, 30-40° C., such as office/home environment and bioprinting, since their viscosity at such temperatures increase drastically, beyond the system's requirements.

Additional background art includes WO 2017/050604, WO 2018/055522 and WO2018/055521, all by the present assignee.

Additional Background art includes U.S. patent application having Publication No. 2003/0207959; and PCT International Patent Applications having Publication Nos. WO 2016/142947; WO 2017/029657; and WO 2017/122211.

SUMMARY OF THE INVENTION

According to an aspect of some embodiments of the present invention there is provided a formulation usable, for example, as a support material formulation in additive manufacturing of a three-dimensional object, the formulation system comprising: at least one hydrophilic curable material which provides, when hardened, a material that is dissolvable or swellable in an aqueous solution; and at least one non-curable material that is capable of being swelled by the hardened material formed of the at least one curable material, the formulation featuring a viscosity of no more than 50 cPs at 35° C.

According to some of any of the embodiments described herein, the additive manufacturing is 3D inkjet printing.

According to some of any of the embodiments described herein, the curable material is a monofunctional curable material.

According to some of any of the embodiments described herein, an amount of the curable material ranges from 15 to 35 weight percents of the total weight of the formulation.

According to some of any of the embodiments described herein, an amount of the non-curable material ranges from 65 to 85 weight percents of the total weight of the formulation.

According to some of any of the embodiments described herein, the non-curable material comprises a propylene glycol or a propylene carbonate moiety.

According to some of any of the embodiments described herein, the formulation comprises: the at least one curable material, in an amount of from 20 to 25 weight percents of the total weight of the formulation; the at least one non-curable material in an amount of from 40 to 60 weight percents of the total weight of the formulation; and water, in an amount of from 20 to 40 weight percents of the total weight of the formulation.

According to some of any of the embodiments described herein, a swelling capacity of the hardened material for a mixture of the at least non-curable material and the water is of at least 70%, or at least 80%, or at least 100%, of its weight.

According to some of any of the embodiments described herein, the at least one curable material comprises a poly (alkylene glycol) acrylate and the at least one non-curable material comprises propylene glycol.

According to some of any of the embodiments described herein, the curable material is a UV-curable material, the formulation further comprising a photoinitiator.

According to some of any of the embodiments described herein, an amount of the photoinitiator is less than 2, or less than 1.5, or less than 1, weight percents, of the total weight of the formulation.

According to some of any of the embodiments described herein, the formulation comprises: the at least one curable material, in an amount of from 20 to 35, or of 20 to 30, or of 25 to 30, weight percents of the total weight of the formulation; and the at least one non-curable material in an amount of from 65 to 80, or of 70 to 80, or of 70 to 75, weight percents of the total weight of the formulation.

According to some of any of the embodiments described herein, the at least one curable material comprises a monofunctional hydrophilic curable material and a multifunctional hydrophilic curable material.

According to some of any of the embodiments described herein, a weight ratio of the monofunctional and multifunctional curable materials ranges from 2:1 to 5:1.

According to some of any of the embodiments described herein, the monofunctional curable material comprises a poly(alkylene glycol) acrylate.

According to some of any of the embodiments described herein, the multifunctional curable material comprises a polyether acrylate.

According to some of any of the embodiments described herein, the at least one non-curable material comprises propylene carbonate.

According to some of any of the embodiments described herein, a swelling capacity of the hardened material for the at least non-curable material is at least 70%, or at least 80%, or at least 100% of its weight.

According to some of any of the embodiments described herein, the curable material is a UV-curable material, the formulation further comprising a photoinitiator.

According to some of any of the embodiments described herein, an amount of the photoinitiator ranges from 1 to 3, of the total weight of the formulation.

According to some of any of the embodiments described herein, the formulation comprises: the at least one curable material, in an amount of from 25 to 30 weight percents of the total weight of the formulation; and the at least one non-curable material in an amount of from 70 to 75 weight percents of the total weight of the formulation.

According to some of any of the embodiments described herein, the at least one curable material is a monofunctional curable material.

According to some of any of the embodiments described herein, the monofunctional curable material provides, when hardened, a material that is dissolvable in an aqueous solution at room temperature, as defined herein.

According to some of any of the embodiments described herein, the non-curable material comprises polypropylene glycol.

According to some of any of the embodiments described herein, an amount of the polypropylene glycol is at least 30% by weight of the total weight of the formulation.

According to some of any of the embodiments described herein, the non-curable material further comprises a polyol.

According to some of any of the embodiments described herein, the curable material is a UV-curable material, the formulation further comprising a photoinitiator.

According to some of any of the embodiments described herein, an amount of the photoinitiator ranges from 1 to 3, of the total weight of the formulation.

According to some of any of the embodiments described herein, the formulation is dissolvable in an aqueous solution.

According to an aspect of some embodiments of the present invention there is provided a method of fabricating a three-dimensional object, the method comprising: receiving three-dimensional printing data corresponding to the shape of the object; dispensing droplets of uncured building material in layers, on a receiving medium, using at least one inkjet printing head, according to the printing data, the uncured building material comprising at least one modeling material formulation and at least one support material formulation, the support material formulation being a formulation according to any of the respective embodiments and any combination thereof, wherein a temperature of the at least one inkjet printing head is no more than 45° C., or no more than 40° C., or no more than 35° C.

According to some of any of the embodiments described herein, the at least one modeling material formulation features a viscosity of no more than 50 cPs at 35° C.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 1A-D are schematic illustrations of an additive manufacturing system according to some embodiments of the invention.

Figure 5:
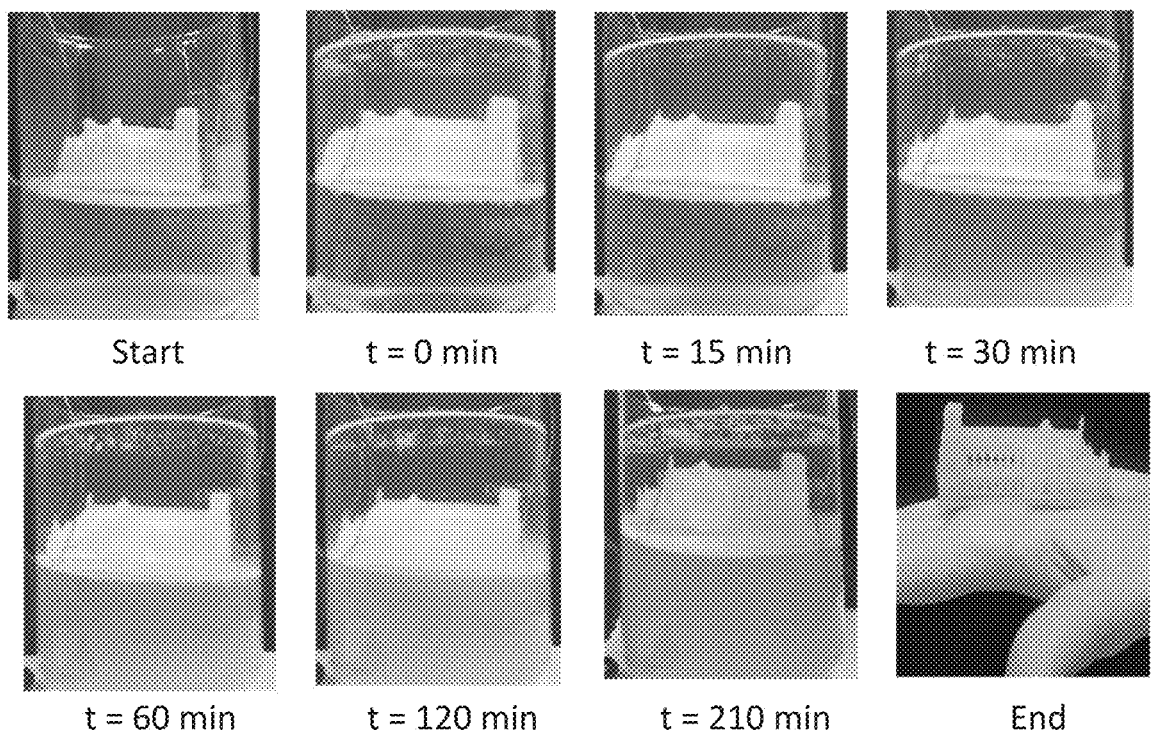

FIG. 5 presents a series of photographs demonstrating the dissolution of a hardened support material from a cathedral-shaped printed object made using an exemplary support material formulation that is dissolvable in aqueous solution according to some of the present embodiments. The printed object was placed in tap water at room temperature, with no stirring.

DESCRIPTION OF SPECIFIC EMBODIMENTS OF THE INVENTION

The present invention, in some embodiments thereof, relates to additive manufacturing and, more particularly, but not exclusively, to support material formulations usable in additive manufacturing processes performed at low working temperatures (e.g., lower than 50° C.).

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As discussed hereinabove, curable materials that are usable in additive manufacturing, and particularly in 3D inkjet printing, of 3D objects, should feature properties, which, in addition to providing objects that feature the required properties, meet the process requirements. In 3D inkjet printing, for example, formulations comprising the curable materials (the uncured building material) should be jettable, that is, stable and compatible with the jetting apparatus, such that effective jetting, without damaging the print heads and the jetting nozzles, is effected.

As further discussed hereinabove, in order to meet the jetting requirements, an uncured building material, including support and modeling material formulations, should feature a relatively low viscosity (e.g., Brookfield Viscosity of up to 50 cps, or up to 35 cps, preferably from 8 to 25 cps) at the working (e.g., jetting) temperature; Surface tension of from about 25 to about 55 Dyne/cm, preferably from about 25 to about 40 Dyne/cm; and a Newtonian liquid behavior and high reactivity to a selected curing condition, to enable fast solidification of the jetted layer upon exposure to a curing condition, of no more than 1 minute, preferably no more than 20 seconds. Additional requirements include low boiling point solvents (if solvents are used), e.g., featuring a boiling point lower than 200 or lower than 190° C., yet characterized preferably by low evaporation rate at the working (e.g., jetting) temperature, and, if the building material includes solid particles, these should feature an average size of no more than 2 microns.

Most of the currently available formulations usable in inkjet printing feature the required viscosity (e.g., from 8 to 25 cps) at a working (e.g., jetting) temperature of 50-90° C., typically 70° C., thus requiring heating the jetting apparatus and optionally the formulation itself, during the printing process.

Such a working temperature prevents the use of volatile solvents, of materials that are temperature-sensitive, such as biological materials, and moreover, is not suitable for applications at office or home environments.

In a search for material formulations that are jettable, as defined herein, at lower temperatures that are compatible with the above-mentioned applications, the present inventors have conducted laborious, extensive studies, in which varying modifications were introduced into currently available building materials (uncured).

During these studies, the present inventors have designed and successfully practiced support material formulations which, when hardened, provide materials that feature properties that are similar to those provided by currently available support material formulations (as described, for example, in U.S. Pat. Nos. 7,479,510, 7,183,335 and 6,569,373 and in PCT International Patent Applications having Publication Nos. WO 2016/142947; WO 2017/029657; and WO 2017/122211), yet, are jettable at low working temperatures, that is, at a temperature which is lower than 50° C.

Embodiments of the present invention therefore relate to novel support material formulations which are usable in additive manufacturing such as 3D inkjet printing, and to additive manufacturing utilizing these formulations.

Herein throughout, the term "object" describes a final product of the additive manufacturing. This term refers to the product obtained by a method as described herein, after removal of the support material. The "object" therefore essentially consists (at least 95 weight percents) of a hardened (e.g., cured) modeling material.

Herein throughout, the term "object" or "printed object" or "fabricated object" describes a product of an additive manufacturing process. This term refers to the product obtained by a method as described herein, before removal of the cured support material. A printed object is therefore made of hardened (e.g., cured) modeling material and hardened (e.g., cured) support material, or, collectively, of a hardened building material.

The term "printed object" as used herein throughout refers to a whole printed object or a part thereof.

The term "model", as used herein, describes a final product of the manufacturing process. This term refers to the product obtained by a method as described herein, after removal of the support material. The model therefore essentially consists of a cured modeling material, unless otherwise indicated. This term is also referred to herein as "model object", "final object" or simply as "object".

The terms "model", "model object", "final object" and "object", as used herein throughout, refer to a whole object or a part thereof.

Herein throughout, the phrases "building material formulation", "uncured building material", "uncured building material formulation", "building material" and other variations therefore, collectively describe the materials that are dispensed to sequentially form the layers, as described herein. This phrase encompasses uncured materials dispensed so as to form the object, namely, one or more uncured modeling material formulation(s), and uncured materials dispensed so as to form the support, namely uncured support material formulations.

Herein throughout, the phrase "modeling material formulation", which is also referred to herein interchangeably as "modeling formulation" or simply as "formulation", describes a part of the uncured building material, which is dispensed so as to form the model object, as described herein. The modeling formulation is an uncured modeling formulation, which, upon exposure to a curing condition (e.g., curing energy), forms the final object or a part thereof.

In some embodiments of the present invention, a modeling material formulation is formulated for use in three-dimensional inkjet printing and is able to form a three-dimensional object on its own, i.e., without having to be mixed or combined with any other substance.

In some embodiments of the present invention, a modeling material formulation is formulated for use in three-dimensional inkjet printing, while circumventing the need to apply heating to the jetting apparatus, for example, to the printing heads and/or nozzle arrays.

An uncured building material can comprise one or more modeling formulations, and can be dispensed such that different parts of the model object are made upon curing different modeling formulations, and hence are made of different cured modeling materials or different mixtures of cured modeling materials.

Herein throughout, the phrase "support material formulation", which is also referred to herein interchangeably as "support formulation", describes a part of the uncured building material, which is dispensed so as to form the support material, as described herein. The support material formulation is an uncured formulation, which, upon exposure to a curing condition (e.g., curing energy), forms the hardened support material.

In some embodiments of the present invention, a support material formulation is formulated for use in three-dimensional inkjet printing, while circumventing the need to apply heating to the jetting apparatus, for example, to the printing heads and/or nozzle arrays.

Herein throughout, the phrases "cured modeling material" and "hardened modeling material", which are used interchangeably, describe the part of the building material that forms a model object, as defined herein, upon exposing the dispensed building material to curing, and following removal of the cured support material, if present. The cured modeling material can be a single cured material or a mixture of two or more cured materials, depending on the modeling material formulations used in the method, as described herein.

Herein throughout, the phrase "hardened support material" is also referred to herein interchangeably as "cured support material" or simply as "support material" and describes the part of the hardened (cured) building material that is intended to support the fabricated final object during the fabrication process, and which is removed once the process is completed and a hardened modeling material is obtained.

In some of any of the embodiments described herein, an uncured formulation (of a building material, a support material and a modeling material) is typically a curable formulation, which forms a hardened material upon curing.

Herein throughout, the term "curable formulation" describes a mixture of materials which, when exposed to a curing condition (e.g., curing energy), as described herein, solidifies or hardens to form a cured material as defined herein. Curable formulations comprise one or more curable materials, and may optionally further comprise one or more non-curable materials, initiators, and other additives.

The formulations forming the building material (modeling material formulations and support material formulations) comprise one or more curable materials, which, when exposed to a curing condition, form hardened (cured) material. These formulations are curable formulations, and can comprise one or more curable materials and optionally one or more agents for promoting hardening of the curable materials.

Herein throughout, a "curable material" is a compound (typically a monomeric or oligomeric compound, yet optionally a polymeric material) which, when exposed to a curing condition, as described herein, solidifies or hardens to form a cured material. Curable materials are typically polymerizable materials, which undergo polymerization and/or cross-linking when exposed to a suitable curing condition (e.g., a suitable energy source).

Herein, the phrases "exposing to a curing energy", "exposing to curing", "exposing to curing conditions" and "exposing to an energy source that affects curing", and grammatically diversions thereof, are used interchangeably, and mean that dispensed layers of uncured building material are exposed to the curing energy and the exposure is typically performed by applying a curing energy to the dispensed layers.

A "curing energy" typically includes application of radiation or application of heat.

The radiation can be electromagnetic radiation (e.g., ultraviolet or visible light), or electron beam radiation, or ultrasound radiation or microwave radiation, depending on the materials to be cured. The application of radiation (or irradiation) is effected by a suitable radiation source. For example, an ultraviolet or visible or infrared or Xenon lamp can be employed, as described herein.

A curable material, according to the present embodiments, also encompasses materials which harden or solidify (cure) without being exposed to a curing energy, but rather to a curing condition (for example, upon exposure to a chemical reagent), or simply upon exposure to the environment.

The terms "curable" and "solidifiable" as used herein are interchangeable.

The polymerization can be, for example, free-radical polymerization, cationic polymerization or anionic polymerization, and each can be induced when exposed to curing energy such as, for example, radiation, heat, etc., as described herein.

In some of any of the embodiments described herein, a curable material is a photopolymerizable material, which polymerizes and/or undergoes cross-linking upon exposure to radiation, as described herein, and in some embodiments the curable material is a UV-curable material, which polymerizes and/or undergoes cross-linking upon exposure to UV radiation, as described herein.

In some embodiments, a curable material as described herein is a photopolymerizable material that polymerizes via photo-induced free-radical polymerization. Alternatively, the curable material is a photopolymerizable material that polymerizes via photo-induced cationic polymerization.

In some of any of the embodiments described herein, a curable material can be a monomer, an oligomer or a (e.g., short-chain) polymer, each being polymerizable and/or cross-linkable as described herein.

In some of any of the embodiments described herein, when a curable material is exposed to a curing condition (e.g., radiation), it hardens (undergoes curing) by any one, or combination, of chain elongation and cross-linking.

In some of any of the embodiments described herein, a curable material is a monomer or a mixture of monomers, which can form a polymeric material upon a polymerization reaction, when exposed to a curing condition (e.g., curing energy) at which the polymerization reaction occurs. Such curable materials are also referred to herein as monomeric curable materials.

Herein and in the art, the term "monomer" or "monomeric" describes a material that is devoid of repeating backbone units that are linked to one another.

In some of any of the embodiments described herein, a curable material is an oligomer or a mixture of oligomers which can form a polymeric material upon a polymerization reaction, when exposed to a curing condition (e.g., curing energy) at which the polymerization reaction occurs. Such curable materials are also referred to herein as oligomeric curable materials.

Herein and in the art, the term "oligomer" or "oligomeric" describes a material that comprises repeating backbone units that are linked to one another, wherein the number of such repeating units is from 2 to 10.

In some of any of the embodiments described herein, a curable material is a polymer or a mixture of polymers which can form a higher and/or cross-linked polymeric material upon a polymerization reaction, when exposed to a curing condition (e.g., curing energy) at which the polymerization reaction occurs. Such curable materials are also referred to herein as polymeric curable materials.

Herein and in the art, the term "polymer" or "polymeric" describes a material that comprises repeating backbone units that are linked to one another, wherein the number of such repeating units is higher than 10. A "polymer" or "polymeric material" can also be defined as such that when a few backbone units are removed from the material, its properties do not change significantly.

In some of any of the embodiments described herein, a curable material, whether monomeric or oligomeric or polymeric, can be a mono-functional curable material or a multi-functional curable material.

Herein, a mono-functional curable material comprises one functional group that can undergo polymerization when exposed to a curing condition (e.g., curing energy such as radiation).

A multi-functional curable material comprises two or more, e.g., 2, 3, 4 or more, functional groups that can undergo polymerization when exposed to a curing condition (e.g., curing energy). Multi-functional curable materials can be, for example, di-functional, tri-functional or tetra-functional curable materials, which comprise 2, 3 or 4 groups that can undergo polymerization, respectively. The two or more functional groups in a multi-functional curable material are typically linked to one another by a linking moiety, as defined herein. When the linking moiety is an oligomeric or polymeric moiety, the multi-functional group is an oligomeric or polymeric multi-functional curable material. Multi-functional curable materials can undergo polymerization when subjected to a curing condition (e.g., curing energy) and/or act as cross-linkers.

Herein throughout, whenever the phrase "weight percents" is indicated in the context of embodiments of a curable formulation, it is meant weight percents of the total weight of the formulation as described herein.

The phrase "weight percents" is also referred to herein as "% by weight" or "% wt." or "wt. %".

Embodiments of the present invention relate to novel support material formulations which are usable is additive manufacturing of three-dimensional objects, and which feature a viscosity of no more than 50 centipoises (cPs or cps) at a temperature of 35° C., where the viscosity is determined according to standard procedures known in the art and/or as described in the Examples section that follows.

The formulations described herein provide, when hardened, support materials which feature properties which are compared to currently used support material formulations, including soluble support material formulations as described herein.

Embodiments of the present invention further relate to kits in which the novel support material formulations disclosed herein are packaged.

Embodiments of the present invention further relate to a method of additive manufacturing a three-dimensional object using the support material formulations described herein.

The method of the present embodiments manufactures three-dimensional objects in a layerwise manner by forming a plurality of layers in a configured pattern corresponding to the shape of the objects, as described herein.

The method is generally effected by sequentially forming a plurality of layers in a configured pattern corresponding to the shape of the object, such that formation of each of at least a few of said layers, or of each of said layers, comprises dispensing a building material (uncured) which comprises one or more modeling material formulation(s) and one or more support material formulations, as described herein, and exposing the dispensed modeling material to a curing condition (e.g., curing energy) to thereby form a printed object, as described in further detail hereinafter.

In some exemplary embodiments of the invention an object is manufactured by dispensing a building material (uncured) that comprises one or more modeling material formulations and one or more support material formulations, each formulation from a different dispensing head and/or a different array of nozzles of an inkjet printing apparatus. The dispensed formulations are optionally and preferably deposited in layers during the same pass of the printing heads. The formulations and/or combinations of formulations within the layer are selected according to the desired properties of the object, and as further described in detail hereinbelow.

The final three-dimensional object is made of the modeling material or a combination of modeling materials or a combination of modeling material/s and support material/s or modification thereof (e.g., following curing). All these operations are well-known to those skilled in the art of solid freeform fabrication.

The Support Material Formulation:

According to an aspect of some embodiments of the present invention there is provided a formulation usable as a support material formulation in additive manufacturing of a three-dimension object, the formulation features a viscosity of no more than 50 cPs at 35° C., as defined herein.

According to some of any of the embodiments described herein, the formulation features a viscosity of no more than 40, or no more than 30, or no more than 25, or no more than 20, and even of less than 20, cPs, at 35° C.

According to some of any of the embodiments described herein, the formulation features a viscosity in the range of from about 8 to about 50, or from about 8 to about 40, or from about 8 to about 30, or from about 8 to about 25, or from about 8 to about 20, or from about 8 to about 15, cPs, at 35° C., including any intermediate value and subranges therebetween.

According to some of any of the embodiments described herein, the formulation features a viscosity in the range of from about 8 to about 50, or from about 8 to about 40, or from about 8 to about 30, or from about 8 to about 25, or from about 8 to about 20, or from about 8 to about 15, cPs, at 30° C., including any intermediate value and subranges therebetween.

According to some of any of the embodiments described herein, the formulation is suitable for use, or is usable, in additive manufacturing processes, as described herein.

According to some of any of the embodiments described herein, the formulation is suitable for use, or is usable, in 3D inkjet printing, as described herein.

According to some of any of the embodiments described herein, the formulation is compatible with the jetting printing apparatus, particularly with the inkjet print heads and nozzle arrays therein which dispense the formulations, as it features the required viscosity so as to be readily dispensed from the print heads, it features the required surface tension, and it is sufficiently stable (non-reactive) at the jetting conditions so as to avoid clogging of the printing heads and/or nozzle arrays therein.

According to some of any of the embodiments described herein, the formulation meets all the requirements of a 3D inkjet printing system, as recognized in the art and described herein.

According to some of any of the embodiments described herein, the formulation comprises one or more curable materials, as defined herein.

According to some of any of the embodiments described herein, each of the one or more curable materials can be monomeric curable materials, oligomeric curable materials or a mixture of monomeric and oligomeric curable materials, as defined herein.

According to some of any of the embodiments described herein, an average molecular weight of the curable materials in a formulation is no more than 500 grams/mol.

By "average molecular weight" it is meant the sum of molecular weights of all the curable materials in a formulation, divided by the number of curable materials in the formulation.

According to some of any of the embodiments described herein, an average molecular weight of the curable materials ranges from 200 to 500 grams/mol, or from 250 to 500 grams/mol, or from 300 to 500 grams/mol, including any intermediate value and subranges therebetween.

According to some of any of the embodiments described herein, a relative average molecular weight of the two or more curable materials is no more than 500 grams/mol.

By "relative average molecular weight" it is meant the averaged molecular weight of the curable materials in the formulation or formulation system relative to their concentration in the formulation or formulation system, that is the sum of a molecular weight multiplied by a relative concentration in the formulation or formulation system, for each component, divided by the total concentration of curable materials in the formulation or formulation system, as follows:

(MWx% wt. of A+MW a % wt. of B)/total % wt. of curable materials.

According to some of any of the embodiments described herein, a relative average molecular weight of the two or more curable materials ranges from 200 to 500 grams/mol, or from 250 to 500 grams/mol, or from 300 to 500 grams/mol, including any intermediate value and subranges therebetween.

According to some of any of the embodiments described herein, the formulation comprises at least one hydrophilic curable material which provides, when hardened, a material that is dissolvable or swellable in an aqueous solution; and at least one non-curable material that is capable of being swelled by the hardened material formed of the at least one curable material.

Herein throughout, by "dissolvable in an aqueous solution" it is meant that at least 80% of the indicated hardened material, when contacting an aqueous solution, dissolves. In some embodiments, at least 80% of the hardened material dissolves upon contacting the aqueous solution, during a time period that ranges from a few minutes to a few hours, depending on the temperature and other conditions of the contacting and on the size and shape of the formed hardened material.

The contacting can be at room temperature or at elevated temperatures, and can be accompanied by mechanical means such as water jet or others. The aqueous solution can be water or any other solution usable for dissolving hardened support materials, such as, for example, alkaline solutions.

In some of any of the embodiments described herein, a hardened material that is dissolvable in an aqueous solution is such that at least 80% of the hardened material dissolves upon contacting the aqueous solution, as described herein, during a time period of less than 24 hours, or less than 12 hours, or less than 6 hours, or less than 3 hours, or less than 1 hour. In some embodiments, the contacting is at room temperature. In some embodiments, the aqueous solution is water. In some embodiments, the contacting is at room temperature and the aqueous solution is water or an alkaline aqueous solution.

The "hardened material" as used herein refers to the material formed once a dispensed formulation is exposed to a curing condition. In some embodiments, a "hardened material" is a polymeric material formed when a curable material undergoes polymerization and/or cross-linking, as described herein, upon exposure to a curing condition (e.g., curing energy) as described herein.

Herein throughout, when properties of a hardened material are described, the property relates to a hardened material formed of a curable material or formulation per se.

In some embodiments, the non-curable material is a water-miscible material.

Herein throughout, the term "water-miscible" describes a material, which is at least partially dissolvable or dispersible in water at ambient temperature, that is, at least 50% of the molecules move into the water upon mixture. This term encompasses the terms "water-soluble" and "water dispersible".

Herein throughout, the term "water-soluble" describes a material that when mixed with water in equal volumes or weights, at ambient temperature, a homogeneous solution is formed.

Herein throughout, the term "water-dispersible" describes a material that forms a homogeneous dispersion when mixed with water in equal volumes or weights, at ambient temperature.

Herein throughout, the phrase "dissolution rate" describes a rate at which a substance is dissolved in a liquid medium as indicated. Dissolution rate can be determined, in the context of the present embodiments, by the time needed to dissolve a certain amount of support material. The measured time is referred to herein as "dissolution time".

Herein throughout, whenever the phrase "weight percents" is indicated in the context of embodiments of a support material formulation, it is meant weight percents of the total weight of the uncured support material formulation as described herein.

The phrase "weight percents" is also referred to herein as "% by weight" or "% wt.".

Herein throughout, the term "hydrophilic" describes a physical property of a compound or a portion of a compound (e.g., a chemical group in a compound) which accounts for transient formation of bond(s) with water molecules, typically through hydrogen bonding.

A hydrophilic compound or portion of a compound (e.g., a chemical group in a compound) is one that is typically charge-polarized and capable of hydrogen bonding.

Hydrophilic compounds or groups typically include one or more electron-donating heteroatoms which form strong hydrogen bonds with water molecules. Such heteroatoms include, but are not limited to, oxygen and nitrogen. Preferably, a ratio of the number of carbon atoms to a number of heteroatoms in a hydrophilic compounds or groups is 10:1 or lower, and can be, for example, 8:1, more preferably 7:1, 6:1, 5:1 or 4:1, or lower. It is to be noted that hydrophilicity of compounds and groups may result also from a ratio between hydrophobic and hydrophilic moieties in the compound or chemical group, and does not depend solely on the above-indicated ratio.

Hydrophilic compounds dissolve more readily in water than in oil or other hydrophobic solvents. Hydrophilic compounds can be determined by, for example, as having LogP lower than 0.5, when LogP is determined in octanol and water phases, at a temperature lower than 50° C., or lower than 40° C., or lower than 35° C. or lower than 30° C., e.g., at 25° C.

Alternatively, hydrophilic compounds can be determined by, for example, the Hansen parameters, as having relative energy distance (RED) higher than 1, when calculated for interaction with water as a solvent, at a temperature lower than 50, or lower than 40° C., or lower than 35° C. or lower than 30° C., e.g., at 25° C.

A hydrophilic compound can have one or more hydrophilic groups that render the compound hydrophilic. Such groups are typically polar groups, comprising one or more electron-donating heteroatoms such as oxygen and nitrogen. The hydrophilic group can be, for example, one or more substituent(s) of a monomeric mono-functional curable material or two or more substituents or interrupting groups of an oligomeric mono-functional curable material. The hydrophilic group can be, for example, one or more substituent(s) of a monomeric multi-functional curable material or one or more substituents or interrupting groups of a linking moiety of a monomeric multi-functional curable moiety. The hydrophilic group can be, for example, two or more substituents or interrupting groups of an oligomeric linking moiety in oligomeric multi-functional curable material.

Exemplary hydrophilic groups include, but are not limited to, an electron-donating heteroatom, a carboxylate, a thiocarboxylate, oxo (=O), a linear amide, hydroxy, a (C1-4) alkoxy, an (C1-4)alcohol, a heteroalicyclic (e.g., having a ratio of carbon atoms to heteroatoms as defined herein), a cyclic carboxylate such as lactone, a cyclic amide such as lactam, a carbamate, a thiocarbamate, a cyanurate, an isocyanurate, a thiocyanurate, urea, thiourea, an alkylene glycol (e.g., ethylene glycol or propylene glycol), and a hydrophilic polymeric or oligomeric moiety, as these terms are defined hereinunder, and any combinations thereof (e.g., a hydrophilic group that comprises two or more of the indicated hydrophilic groups).

In some embodiments, the hydrophilic group is, or comprises, an electron donating heteroatom, a carboxylate, a heteroalicyclic, an alkylene glycol and/or a hydrophilic oligomeric moiety.

A hydrophilic polymeric or oligomeric moiety, as used herein, comprises a polymeric chain, which comprises hydrophilic groups as defined herein. The hydrophilic groups can be heteroatoms within the backbone chain of the polymeric moiety, as, for example, in poly(alkylene glycols) or hydrophilic pendant groups. A polymeric or oligomeric moiety, according to some embodiments of the present invention, preferably has from 10 to 40 repeating backbone units, more preferably from 10 to 20 repeating backbone units.

A hydrophilic mono-functional curable material according to some embodiments of the present invention can be a vinyl-containing compound represented by Formula I:

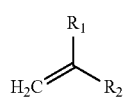

Formula I wherein at least one of $R_1$ and $R_2$ is and/or comprises a hydrophilic group, as defined herein.

The (=CH$_2$) group in Formula I represents a polymerizable group, and is typically a UV-curable group, such that the material is a UV-curable material.

For example, $R_1$ is a hydrophilic group as defined herein and $R_2$ is a non-hydrophilic group, for example, hydrogen, C(1-4) alkyl, C(1-4) alkoxy, or any other substituent, as long as the compound is hydrophilic, as defined herein.

In some embodiments, $R_1$ is a carboxylate, —C(=O)—OR' group, and $R_2$ is hydrogen, and the compound is a mono-functional acrylate monomer. In some of these embodiments, $R_2$ is methyl, and the compound is mono-functional methacrylate monomer. In other embodiments, $R_2$ is a hydrophilic substituent, namely, a substituent which is, or which comprises, a hydrophilic group as described herein.

In some of any of these embodiments, the carboxylate group, —C(=O)—OR', comprises R' which is a hydrophilic group. Exemplary R' groups include, but are not limited to, heteroalicyclic groups (having a ratio of 5:1 or lower of carbon atoms to electron-donating heteroatoms, such as morpholine, tetrahydrofurane, oxalidine, and the likes), hydroxyl, C(1-4)alkoxy, thiol, alkylene glycol or a polymeric or oligomeric moiety, as described herein. An exemplary monomeric mono-functional acrylate is acryloyl morpholine (ACMO).

In some embodiments, $R_1$ is amide, and in some embodiments, it is a cyclic amide such as lactam, and the compound is a vinyl lactam. In some embodiments, $R_1$ is a cyclic carboxylate such as lactone, and the compound is a vinyl lactone.

When one or both of $R_1$ and $R_2$ comprise a polymeric or oligomeric moiety, for example, a hydrophilic oligomeric moiety, as defined herein, the mono-functional curable compound of Formula I is an exemplary oligomeric mono-functional curable material. Otherwise, it is an exemplary monomeric mono-functional curable material.

Exemplary oligomeric mono-functional curable materials include, but are not limited to, a mono-(meth)acrylated urethane oligomer derivative of polyethylene glycol, a mono-(meth)acrylated polyol oligomer, a mono-(meth)acrylated oligomer having hydrophilic substituents, and a mono-(meth)acrylated polyethylene glycol (e.g., methoxypolyethylene glycol). (Meth)acrylated means that the oligomer or polymer comprises an acrylate or methacrylate functional group.

In some embodiments, $R_1$ is a carboxylate and R' is a poly(alkylene glycol), as defined herein. An exemplary such hydrophilic monofunctional curable material is hexa(ethylene glycol) acrylate, (6-PEA).

In some embodiments, $R_1$ is a hydrophilic heteroalicyclic group, as defined herein. An exemplary such hydrophilic monofunctional curable material is ACMO.

A hydrophilic multi-functional curable material according to some embodiments of the present invention can be represented by Formula II:

Formula II

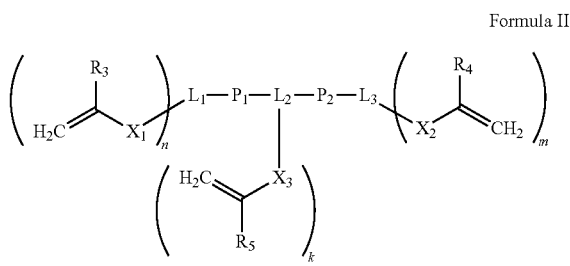

wherein:
each of $R_3$, $R_4$ and $R_5$ is independently hydrogen, C(1-4) alkyl, or a hydrophilic group, as defined herein;
each of $L_1$, $L_2$ and $L_3$ is independently a linking moiety or absent;
each of $P_1$ and $P_2$ is independently a hydrophilic group as defined herein or absent;
each of $X_1$, $X_2$ and $X_3$ is independently C(1-4)alkyl, or a hydrophilic group, as defined herein, or absent; and
each of n, m and k is 0, 1, 2, 3 or 4,
provided that n+m+k is at least 2, and provided that at least one of $R_3$, $R_4$, $R_5$, $X_1$, $X_2$, $X_3$ $P_1$ and $P_2$ is a hydrophilic group, as defined herein.

Multi-functional curable materials of Formula II in which one, two or all of $X_1$, $X_2$ and $X_3$, when present, is oxo, are multi-functional acrylates, which can be further substituted by a hydrophilic group, as described hereinabove. When one or more of $R_3$, $R_4$ and $R_5$, when present, is methyl, the curable materials are multi-functional methacrylates.

Multifunctional curable materials in which one, two or all of $X_1$, $X_2$ and $X_3$, when present, is oxo, can include a combination of acrylate and methacrylate functional moieties.

In some embodiments, the acrylate or methacrylate multifunctional curable material is monomeric, such that none of $P_1$ and $P_2$ is a polymeric or oligomeric moiety. In some of these embodiments, one or both of $P_1$ and $P_2$ is a hydrophilic group as described herein, for example, an alkylene glycol, or any other hydrophilic linking group, or a short chain (e.g., of 1-6 carbon atoms), substituted or unsubstituted hydrocarbon moiety, as defined herein.

In some embodiments, one or both of $P_1$ and $P_2$ is a polymeric or oligomeric moiety as defined herein, and the curable compound is an oligomeric multi-functional curable material, for example, an oligomeric multi-functional acrylate or methacrylate, as described herein for $X_1$, $X_2$ and/or $X_3$. If both $P_1$ and $P_2$ are present, $L_2$ can be, for example, a linking moiety such as a hydrocarbon, comprising alkyl, cycloalkyl, aryl and any combination thereof. Exemplary such curable materials include ethoxylated or methoxylated polyethylene glycol diacrylate, and ethoxylated bisphenol A diacrylate.

Other non-limiting examples include polyethylene glycol diacrylate, polyethylene glycol dimethacrylate, polyethylene glycol-polyethylene glycol urethane diacrylate, and a partially acrylated polyol oligomer.

In some embodiments, one or more of $P_1$ and $P_2$ is, or comprises, a poly(alkylene glycol) moiety, as defined herein.

In some of any of the embodiments of an acrylate or methacrylate multifunctional curable material of Formula II, one or more of $R_3$, $R_4$ and $R_5$ i a hydrophilic group as described, for example, for $R_1$ and $R_2$ in Formula I, herein. In these embodiments, $P_1$ and/or $P_2$ can be present or absent, and can be, or comprise, a hydrophilic group or not, as long as the material is hydrophilic, as defined herein.

Alternatively, one, two or all of $X_1$, $X_2$ and $X_3$, when present, can be —O—, such that at least one functional moiety in the multi-functional curable material is vinyl ether.

In some embodiments, n and m are each 1, k is 0, $X_1$ is O, $X_2$ is absent, and the compound is a vinyl ether, which can be substituted or not. In some of these embodiments, $L_1$, $L_2$, $L_3$, $P_1$ and $P_2$ are absent, and the compound is a monomeric vinyl ether. Examples of monomeric vinyl ethers include ethyl vinyl ether, propyl vinyl ether, isobutyl vinyl ether, cyclohexyl vinyl ether, 2-ethylhexyl vinyl ether, butyl vinyl ether, ethyleneglycol monovinyl ether, diethyleneglycol divinyl ether, butane diol divinyl ether, hexane diol divinyl ether, cyclohexane dimethanol monovinyl ether and the like.

In some embodiments, $P_1$ and $P_2$ are absent, and one of $L_1$ and $L_2$ is an alkylene chain substituted by one or more hydrophilic groups. An exemplary such curable compound is 1,4-cyclohexane dimethanol divinyl ether.

In some embodiments, one or more of $P_1$ and $P_2$ is a hydrophilic polymeric or oligomeric moiety, as defined herein. In some embodiments, one or more of $P_1$ and $P_2$ is, or comprises, a poly(alkylene glycol) moiety, as defined herein. In some embodiments the polymeric moiety is substituted by one or more vinyl ether substituents.

In some of any of the embodiments related to Formula II, one or more of the substituents of the polymerizable group, $R_3$, $R_4$ and $R_5$, can be a hydrophilic group as described for $R_1$ and $R_2$ in Formula I herein.

In some of any of the embodiments related to Formula II, when $P_1$ and $P_2$ is a polymeric or oligomeric moiety, this moiety can comprise hydrophilic heteroatoms as defined herein, within the backbone chain or the backbone chain can be substituted by hydrophilic groups, as described herein.

In exemplary embodiments, a multifunctional hydrophilic curable material is a multifunctional polyether urethane di- or tri-acrylate, and in some embodiments, such a curable material further features amine groups. An exemplary such material is marketed by Sartomer as CN550.

According to some of any of the embodiments described herein, each of the hydrophilic curable materials is a monomeric or oligomeric, mono-functional or multi-functional, acrylate or methacrylate, for example, as described herein in any of the respective embodiments.

According to some of any of the embodiments described herein, a hydrophilic curable material as described herein is water-soluble or water-miscible.

According to some of any of the embodiments described herein, a hydrophilic curable material as described herein is also referred to herein as a polar curable material.

Additional curable materials usable in the context of the present embodiments are described, for example, in PCT International Patent Applications having Publication Nos. WO 2016/142947; WO 2017/029657; and WO 2017/122211, which are incorporated by reference as if fully set forth herein.

In some of any of the embodiments described herein, the hydrophilic curable material is such that provides, when hardened per se (without additional curable or non-curable materials), a material that is dissolvable or swellable in an aqueous solution, as defined herein. In some of any of the embodiments described herein, the hydrophilic curable material is such that provides, when hardened per se, a material that is dissolvable an aqueous solution, as defined herein. An exemplary such material is ACMO.

In some of any of the embodiments described herein, the curable material provides, when hardened per se (without additional curable or non-curable materials) a material that is water insoluble (a material that is not water-soluble or not water-miscible, as defined herein). An exemplary such material is 6-PEA.

In some of any of the embodiments described herein, a support material formulation comprises, in addition to the curable monomers, one or more water-miscible material(s), which can be any of the water-miscible polymeric materials commonly used in support material formulations.

In some of any of the embodiments described herein, the water-miscible material is non-curable (also referred to herein as "non-reactive"). The term "non-curable" encompasses polymeric materials that are non-polymerizable under any conditions or polymeric materials that are non-curable under conditions at which the mono-functional monomer as described herein is curable, or under any condition used in a fabrication of an object according to the present embodiments. Such materials are typically devoid of a polymerizable group or of a UV-photopolymerizable group. In some embodiments, the material is non-reactive towards the curable monomer as described herein, that is, it does not react with the monomer and is incapable of interfering with the curing of the monomer, under the fabrication conditions, including the curing conditions.

In some of any of the embodiments described herein the non-curable material is water soluble or water dispersible or water miscible polymeric material, as defined herein.

In some embodiments, the non-curable material is a polymeric material, which comprises a plurality of hydrophilic groups as defined herein, either within the backbone chain of the polymer or as pendant groups. Exemplary such polymeric materials are polyols. Some representative examples include, but are not limited to, Polyol 3165, polypropylene glycol, polyethylene glycol, poly glycerol, polyglyme, ethoxylated forms of these polymers, paraffin oil and the like, and any combination thereof.

In some embodiments, the hydrophilic, polymeric non-curable material has a molecular weight of from 400 to 2000 grams/mol, or from 400 to 1200 grams/mol, including any intermediate values and subranges therebetween.

In some of any of the embodiments described herein, the support material formulation comprises a water-miscible, non-curable, non-polymeric material, such as, for example, propane diol (e.g., 1,2-propandoil, also referred to herein and in the art as propylene glycol), propane triol, glycerol, butyl diglyme (Butyl Di Glycol Acetate, Diethylene glycol butyl ether acetate,2-(2-Butoxyethoxy)ethyl acetate), Diethylene glycol monobutyl ether (BDG), (EDGAc) Diethylene glycol monoethyl ether acetate (EDGAc; DGMEA), Di(ethylene glycol) ethyl ether (DEGEE), Tri(propyleneglycol) methyl ether, Dipropylene glycol monomethyl ether (DPGME), Di(propylene glycol) methyl ether acetate (DPGMEA), propylene carbonate (1,2-Propanediol cyclic carbonate, 4-Methyl-1,3-dioxolan-2-one), Diethylene glycol methyl ether (DGME), Diethylene glycol methyl ether (TGMME), 1-Methoxy-2-propanol (PGME/PM; Propyleneglycol monomethyl ether), and Propylene glycol monomethyl ether acetate (PGMEA).

In some of any of the embodiments described herein, the support material formulation comprises a water-miscible, non-curable material, which comprises a mixture of two or more of the polymeric and non-polymeric water-miscible, non-curable materials described herein. An exemplary such a mixture may comprise two or more of a polyethylene glycol, a polypropylene glycol, a propanetriol, a propanediol. Propylene carbonate and a polyol such as Polyol 3165.

The phrase "non-curable material" as used herein does not encompass water.

In some of any of the embodiments described herein, the curable and non-curable materials composing the support material formulations described herein are selected such that a swelling capacity of a hardened material formed of the curable material(s) with respect to the non-curable material(s) or to a mixture of the non-curable material(s) and water (if present) is at least 70%, or at least 80%, or at least 100%.

By "swelling capacity" it is meant that the hardened material is capable of swelling the indicated weight percentage of the non-curable material(s) or the mixture thereof with water, of its weight before swelling. For example, a hardened material that weights 100 grams and has a swelling capacity of 120% is capable of swelling 120 grams of the non-curable material(s) or the mixture thereof with water.

In some of any of the embodiments described herein, the at least one non-curable material comprises at least one propylene glycol moiety or propylene carbonate moiety. Such non-curable materials can be polymeric or non-polymeric materials and include, as non-limiting example, non-polymeric materials such as propylene glycol, propylene carbonate, Tri(propyleneglycol)methyl ether, Dipropylene glycol monomethyl ether (DPGME), Di(propylene glycol) methyl ether acetate (DPGMEA), propylene carbonate (1,2-Propanediol cyclic carbonate, 4-Methyl-1,3-dioxolan-2-one), Diethylene glycol methyl ether (DGME), Diethylene glycol methyl ether (TGMME), 1-Methoxy-2-propanol (PGME/PM; Propyleneglycol monomethyl ether), and Propylene glycol monomethyl ether acetate (PGMEA), and polypropylene glycol as a polymeric material.

In some of any of the embodiments described herein, the formulation comprises one non-curable material that comprises a propylene glycol or a propylene carbonate moiety, and in some embodiments, the formulation comprises two or more such non-curable materials, for example, a mixture of polypropylene glycol and one or more non-polymeric materials that comprise one or more propylene glycol moieties as exemplified hereinabove.

A support material formulation as described herein in any of the respective embodiments can further comprise additional agents, for example, initiators, inhibitors, stabilizers and the like.

In some of any of the embodiments described herein, and any combination thereof, the support material formulation further comprises an initiator, for inducing a polymerization of the curable materials upon exposure to curing energy or curing conditions.

In some of these embodiments, one or more or all of the curable materials is a UV-curable material and the initiator is a photoinitiator.

The photoinitiator can be a free radical photo-initiator, a cationic photo-initiator, or any combination thereof.

A free radical photoinitiator may be any compound that produces a free radical upon exposure to radiation such as ultraviolet or visible radiation and thereby initiates a polymerization reaction. Non-limiting examples of suitable photoinitiators include phenyl ketones, such as alkyl/cycloalkyl phenyl ketones, benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BAPO's); benzoins and benzoin alkyl ethers such as benzoin, benzoin methyl ether and benzoin isopropyl ether and the like. Examples of photoinitiators are alpha-amino ketone, and 1-hydroxycyclohexyl phenyl ketone (e.g., marketed as Irgacure® 184).

A free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical, which initiates polymerization of acrylates. Non-limiting example of a class of co-initiators are alkanolamines such as triethylamine, methyldiethanolamine and triethanolamine.

Suitable cationic photoinitiators include, for example, compounds which form aprotic acids or Bronsted acids upon exposure to ultraviolet and/or visible light sufficient to initiate polymerization. The photoinitiator used may be a single compound, a mixture of two or more active compounds, or a combination of two or more different compounds, i.e. co-initiators. Non-limiting examples of suitable cationic photoinitiators include aryldiazonium salts, diaryliodonium salts, triarylsulphonium salts, triarylselenonium salts and the like. An exemplary cationic photoinitiator is a mixture of triarylsolfonium hexafluoroantimonate salts.

In some of any of the embodiments described herein, the uncured support material formulation may further comprise one or more additional agents that are beneficially used in the fabrication process. Such agents include, for example, surface active agents, inhibitors and stabilizers.

In some embodiments, a support material formulation as described herein comprises a surface active agent. A surface-active agent may be used to reduce the surface tension of the formulation to the value required for jetting or for other printing process, which is typically around 30 dyne/cm. An exemplary such agent is a silicone surface additive such as, but not limited to, a surface agent marketed as BYK-345.

In some embodiments, a support material formulation as described herein further comprises an inhibitor, which inhibits pre-polymerization of the curable material during the fabrication process and before it is subjected to curing conditions. An exemplary stabilizer (inhibitor) is Tris(N-nitroso-N-phenylhydroxylamine) Aluminum Salt (NPAL) (e.g., as marketed under FirstCure®NPAL).

Suitable stabilizers include, for example, thermal stabilizers, which stabilize the formulation at high temperatures.

In some of any of the embodiments described herein, the support material formulation is devoid of a silicon polyether.

Exemplary Support Material Formulations:

In some of any of the embodiments described herein, a formulation as described herein provides, when hardened, a material (e.g., a support material) that is dissolvable upon contacting, as defined herein, water or any other neutral aqueous solution, at room temperature, without stirring or agitating, and without application of mechanical means such as water jet. Such formulations are also referred to herein as providing a hardened material that is dissolvable in water.

In exemplary embodiments, a hardened material formed of such a formulation (that is, a hardened material that is dissolvable in water) is such that at least 80% by weight of the hardened material dissolves upon contacting water at room temperature, optionally without stirring or any other water circulation, within less than 24 hours, or less than 12 hours, or less than 6 hours, or less than 4 hours.

In exemplary embodiments, a hardened material formed of such a formulation exhibits dissolution profile as presented in FIG. 5 and is further described in the Examples section that follows.

In some of any of the embodiments described herein, a formulation as described herein provides, when hardened, a material (e.g., a support material) that is non-dissolvable upon contacting, as defined herein, water or any other neutral aqueous solution, at room temperature, without stirring or agitating, and without application of mechanical means such as water jet. Such formulations are also referred to herein as providing a hardened material that is non-dissolvable in water.

In exemplary embodiments, a hardened material formed of such a formulation (that is, a hardened material that is dissolvable in water) is such that less than 80%, or less than 50%, or less than 30%, or less than 20%, by weight of the hardened material dissolves upon contacting water at room temperature, optionally without stirring or any other water circulation, within less than 24 hours, or less than 12 hours, or less than 6 hours, or less than 4 hours.

In some of these embodiments, a formulation as described herein provides, when hardened, a material that is dissolvable upon contacting, as defined herein, water or any other neutral aqueous solution, at room temperature, upon application of water jet or other mechanical means (e.g., mechanical means commonly practiced for removing support material in additive manufacturing).

In exemplary embodiments, a hardened material formed of such a formulation (that is, a hardened material that is non-dissolvable in water) is such that at least 80% by weight of the hardened material dissolves upon application of water jet or other mechanical means, within less than 24 hours, or less than 12 hours, or less than 6 hours, or less than 4 hours.

In some of these embodiments, a formulation as described herein provides, when hardened, a material that is dissolvable upon contacting, as defined herein, an alkaline aqueous solution, at room temperature, with or without application of water jet or any other mechanical means, as defined herein.

In exemplary embodiments, a hardened material formed of such a formulation (that is, a hardened material that is non-dissolvable in water) is such that at least 80% by weight of the hardened material dissolves upon contacting an alkaline aqueous solution, at room temperature, within less than 24 hours, or less than 12 hours, or less than 6 hours, or less than 4 hours. In some of any of the embodiments described herein, the support material formulation provides, when hardened, a material that is non-dissolvable in water, as defined herein.

In some of any of these embodiments, an exemplary support material formulation comprises:

at least one curable material as described herein in any of the respective embodiments, in an amount of from 20 to 25 weight percents of the total weight of the formulation;

at least one non-curable material, as described herein in any of the respective embodiments, in an amount of from 40 to 60 weight percents of the total weight of the formulation; and water, in an amount of from 20 to 40 weight percents of the total weight of the formulation.

In some of these embodiments, the curable material provides, when hardened per se, a material that is not dissolvable in water (for example, a poly(alkylene glycol) acrylate such as 6-PEA).

In some of these embodiments, the non-curable material comprises propylene glycol, and in some embodiments an amount of the propylene glycol is at least 30% by weight of the total weight of the formulation.

In some of any of these embodiments, the non-curable material comprises a mixture of two or more non-curable materials, and in some embodiments, it comprises a mixture of propylene glycol and an additional curable material. In some of these embodiments, the additional non-curable material is a non-polymeric non-curable material, such as described herein.

In some of these embodiments, the at least one curable material comprises a poly(alkylene glycol) acrylate (e.g., 6-PEA) and the at least one curable material comprises propylene glycol (1,2-propane diol) in an amount of at least 30% by weight (for example, a mixture of propylene glycol and glycerol).

In some of any of these embodiments, an amount of the photoinitiator is less than 2, or less than 1.5, or less than 1, for example, in a range of 0.1-0.5, weight percents, of the total weight of the formulation.

In some of any of the embodiments described herein for a formulation that provides a hardened material that is non-dissolvable in water as defined herein, an exemplary support material formulation comprises:

at least one curable material, in an amount of from 25 to 30 weight percents of the total weight of the formulation; and at least one non-curable material in an amount of from 60 to 80 weight percents of the total weight of the formulation.

In some of these embodiments, the curable material comprises at least one curable material that provides, when hardened per se, a material that is not dissolvable in water (for example, a poly(alkylene glycol) acrylate such as 6-PEA).

In some of these embodiments, the at least one curable material comprises a mixture of a monofunctional hydrophilic curable material (e.g., poly(alkylene glycol) acrylate) and a multifunctional hydrophilic curable material as described herein in any of the respective embodiments.

In some of these embodiments, a weight ratio of the monofunctional and multifunctional curable materials ranges from 2:1 to 5:1, and can be, for example, 2:1, 3:1, 4:1, 5:1, 5:2, or 3:2. In some embodiments, the weight ratio is 5:2.

In some of these embodiments, the non-curable material comprises propylene carbonate, and in some embodiments an amount of the propylene carbonate is at least 40% by weight of the total weight of the formulation.

In some of any of these embodiments, the non-curable material comprises a mixture of two or more non-curable materials, and in some embodiments, it comprises a mixture of propylene carbonate and an additional curable material. In some of these embodiments, the additional non-curable material is a polymeric non-curable material, such as described herein.

In some of these embodiments, the non-curable material comprises a mixture of propylene carbonate and a polyol, at a weight ratio that ranges from 1:1 to 3:1 (e.g., 2:1).

In some of these embodiments, an amount of the photoinitiator ranges from 1 to 3, of the total weight of the formulation.

In some of any of the embodiments described herein, the support material formulation provides, when hardened, a material that is dissolvable in water, as defined herein.

In some of these embodiments, the curable material provides, when hardened per se, a material that is dissolvable in water, as defined herein.

In some of any of these embodiments, an exemplary support material formulation comprises:

at least one curable material as described herein, in an amount of from 25 to 30 weight percents of the total weight of the formulation; and at least one non-curable material in an amount of from 60 to 80 weight percents of the total weight of the formulation.

In some of these embodiments, the curable material comprises only a mono-functional curable material, for example, ACMO.

In some of these embodiments, the non-curable material comprises a mixture of a polymeric non-curable material such as polypropylene glycol and an additional non-curable material that increases the dissolvability of the hardened material formed of the curable material. Such an additional non-curable material can be, for example, a non-polymeric curable material as described herein, for example, a non-polymeric curable material comprises one or more propylene glycol moieties, as described herein, such as DPGMEA or similar materials.

In some of any of these embodiments, the propylene glycol has a molecular weight in a range of 400 to 1000, or of 400 to 800, or 600, grams/nol.

In some of any of these embodiments, a weight ratio of the polymeric and non-polymeric non-curable materials ranges from 3:1 to 1:1, and can be, for example, 3:1, 4:3, 3:2, 2:1, 5:2.

In some of any of these embodiments, an amount of the polymeric curable material (e.g., polypropylene glycol) is at least 30% by weight of the total weight of the formulation.

In some of any of these embodiments, an amount of the photoinitiator ranges from 1 to 3, of the total weight of the formulation.

Kits:

In some of any of the embodiments described herein there is provided a kit comprising the support material formulation as described herein in any of the respective embodiments and any combination thereof.

In some embodiments, the formulation further comprises a photoinitiator as described herein, and in some of these embodiments, the photoinitiator is packaged individually within the kit, that is, separately from other components of the formulation.

In exemplary embodiments, the formulation is packaged within the kit in a suitable packaging material, preferably, an impermeable material (e.g., water- and gas-impermeable material), and further preferably an opaque material. In some embodiments, the kit further comprises instructions to use the formulations in an additive manufacturing process, preferably a 3D inkjet printing process as described herein, as a support material formulation. The kit may further comprise instructions to use the formulations in the process in accordance with the method as described herein.

The kit my further comprise a modeling material formulation, or instructions to use the support material formulation in combination with a modeling material formulation.

The modeling material formulation can be any modeling material formulation usable in additive manufacturing such as 3D inkjet printing, and is preferably curable under the same conditions at which the support material formulation is curable.

In some embodiments, the modeling material formulation features a viscosity of no more than 50 cPs, or no more than 40, or no more than 30, or no more than 20, cPs, at a temperature of 35° C.

In some embodiments, the modeling material formulation is as described in U.S. Provisional Patent Application No. 62/612,466.

Model Fabrication:

According to an aspect of some embodiments of the present invention there is provided a method of fabricating a three-dimensional model object, which utilizes a support material formulation as described herein. The method is also referred to herein as a fabrication process or as a model fabrication process. In some embodiments, the method comprises dispensing an uncured building material so as to sequentially form a plurality of layers in a configured pattern corresponding to the shape of the object. In some embodiments, the (uncured) building material comprises a modeling material formulation and a support material formulation as described herein in any of the respective embodiments.

The modeling material formulation can be any modeling material formulation usable in additive manufacturing such as 3D inkjet printing, and is preferably curable under the same conditions at which the support material formulation is curable.

In some embodiments, the modeling material formulation features a viscosity of no more than 50 cPs, or no more than 40, or no more than 30, or no more than 20, cPs, at a temperature of 35° C.

In some embodiments, the modeling material formulation is as described in U.S. Provisional Patent No. 62/612,466.

The support material formulation is as described herein in any of the respective embodiments and any combination thereof.

According to some embodiments of the present invention, the fabrication method is additive manufacturing of a three-dimensional model object.

According to some embodiments of this aspect, formation of each layer is effected by dispensing at least one uncured building material, and exposing the dispensed building material to curing energy or curing conditions, to thereby form a cured building material, which is comprised of a cured modeling material and a cured support material.

According to some of any of the embodiments described herein, the additive manufacturing is preferably by three-dimensional inkjet printing.

The method of the present embodiments manufactures three-dimensional objects in a layerwise manner by forming a plurality of layers in a configured pattern corresponding to the shape of the objects.

Each layer is formed by an additive manufacturing apparatus, which scans a two-dimensional surface and patterns it. While scanning, the apparatus visits a plurality of target locations on the two-dimensional layer or surface, and decides, for each target location or a group of target locations, whether or not the target location or group of target locations is to be occupied by building material, and which type of building material (e.g., a modeling material formulation or a support material formulation) is to be delivered thereto. The decision is made according to a computer image of the surface.

When the AM is by three-dimensional printing, an uncured building material, as defined herein, is dispensed from a dispensing head having a set of nozzles to deposit building material in layers on a supporting structure. The AM apparatus thus dispenses building material in target locations which are to be occupied and leaves other target locations void. The apparatus typically includes a plurality of dispensing heads, each of which can be configured to dispense a different building material. Thus, different target locations can be occupied by different building materials (e.g., a modeling formulation and/or a support formulation, as defined herein).

Figure 1A:
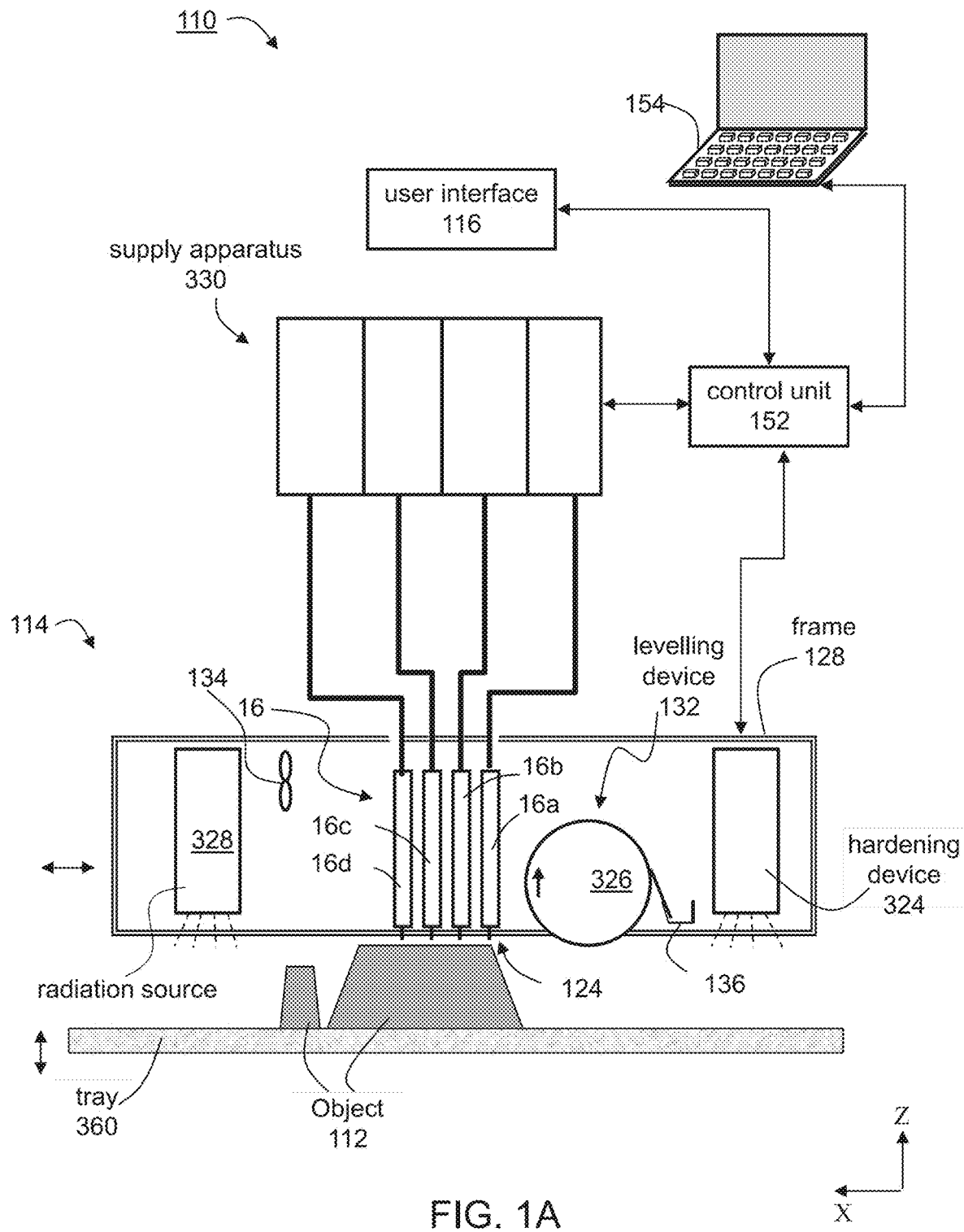
Figure 2A:
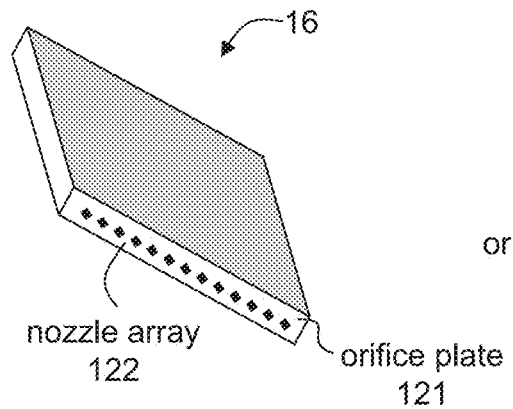
FIGS. 2A-2C are schematic illustrations of print heads according to some embodiments of the present invention.
Figure 2B:
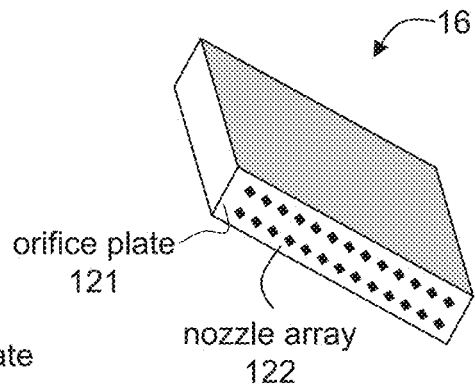
Figure 2C:
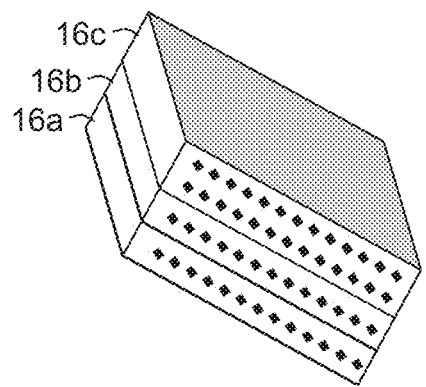

A representative and non-limiting example of a system 110 suitable for AM of an object 112 according to some embodiments of the present invention is illustrated in FIG. 1A. System 110 comprises an additive manufacturing apparatus 114 having a dispensing unit 16 which comprises a plurality of dispensing heads. Each head preferably comprises one or more arrays of nozzles 122, as illustrated in FIGS. 2A-C described below, through which a liquid building material 124 is dispensed.

According to some embodiments of the present invention, apparatus 114 operates at a temperature that does not exceed 35° C.

Preferably, but not obligatorily, apparatus 114 is a three-dimensional inkjet printing apparatus, in which case the dispensing heads are printing heads, and the building material is dispensed via inkjet technology from a printing head having one or more arrays of nozzles to deposit building material formulation in layers on a supporting structure. This need not necessarily be the case, since, for some applications, it may not be necessary for the additive manufacturing apparatus to employ three-dimensional printing techniques. Representative examples of additive manufacturing apparatus contemplated according to various exemplary embodiments of the present invention include, without limitation, fused deposition modeling apparatus and fused material deposition apparatus.

Each dispensing head is optionally and preferably fed via a building material reservoir which may optionally include a temperature control unit (e.g., a temperature sensor and/or a heating device), and a material level sensor. In some embodiments, the temperature control unit is configured so as not to exceed 45° C., 40° C. or 35° C. To dispense the building material, a voltage signal is applied to the dispensing heads to selectively deposit droplets of material via the dispensing head nozzles, for example, as in piezoelectric inkjet printing technology. The dispensing rate of each head depends on the number of nozzles or arrays of nozzles, the type of nozzles and the applied voltage signal rate (frequency). Such dispensing heads are known to those skilled in the art of solid freeform fabrication.

Preferably, but not obligatorily, the overall number of dispensing nozzles or nozzle arrays is selected such that half of the dispensing nozzles are designated to dispense support material and half of the dispensing nozzles are designated to dispense modeling material, i.e. the number of nozzles jetting modeling materials is the same as the number of nozzles jetting support material. In the representative example of FIG. 1A, four dispensing heads 16a, 16b, 16c and 16d are illustrated. Each of heads 16a, 16b, 16c and 16d has a nozzle array. In this Example, heads 16a and 16b can be designated for modeling material/s and heads 16c and 16d can be designated for support material. Thus, head 16a can dispense a first modeling material, head 16b can dispense a second modeling material and heads 16c and 16d can both dispense support material. In an alternative embodiment, heads 16c and 16d, for example, may be combined in a single head having two nozzle arrays for depositing support material. In a further alternative embodiment any one or more of the printing heads may have more than one nozzle arrays for depositing more than one material formulation, e.g. two nozzle arrays for depositing two different modeling material formulations or a modeling material formulation and a support material formulation, each formulation via a different array or number of nozzles.

Yet it is to be understood that it is not intended to limit the scope of the present invention and that the number of modeling material printing heads (modeling heads) and the number of support material printing heads (support heads) may differ. Generally, the number of arrays of nozzles that dispense modeling material formulation, the number of arrays of nozzles that dispense support material formulation, and the number of nozzles in each respective array are selected such as to provide a predetermined ratio, a, between the maximal dispensing rate of the support material formulation and the maximal dispensing rate of modeling material formulation. The value of the predetermined ratio, a, is preferably selected to ensure that in each formed layer, the height of modeling material equals the height of support material. Typical values for a are from about 0.6 to about 1.5.

For example, for a=1, the overall dispensing rate of support material is generally the same as the overall dispensing rate of the modeling material when all the arrays of nozzles operate.

For example, apparatus 114 can comprise M modeling heads each having m arrays of p nozzles, and S support heads each having s arrays of q nozzles such that M×m×p=S×s×q. Each of the M×m modeling arrays and S×s support arrays can be manufactured as a separate physical unit, which can be assembled and disassembled from the group of arrays. In this embodiment, each such array optionally and preferably comprises a temperature control unit and a material formulation level sensor of its own, and receives an individually controlled voltage for its operation.

In some embodiments, the temperature control unit of at least a few of the arrays is configured so as not to exceed 45° C., or 40° C., or 35° C.

Apparatus 114 can further comprise a hardening device 324 which can include any device configured to emit light, heat or the like that may cause the deposited material to harden. For example, hardening device 324 can comprise one or more radiation sources, which can be, for example, an ultraviolet or visible or infrared lamp, or other sources of electromagnetic radiation, or electron beam source, depending on the modeling material being used. In some embodiments of the present invention, hardening device 324 serves for curing or solidifying the modeling material.

As used herein, the term "dispensing head" or "depositing head" encompass printing heads which are dispensing heads usable in 3D printing such as 3D inkjet printing.

The dispensing head(s) and radiation source are preferably mounted in a frame or block 128 which is preferably operative to reciprocally move over a tray 360, which serves as the working surface. In some embodiments of the present invention the radiation sources are mounted in the block such that they follow in the wake of the dispensing heads to at least partially cure or solidify the materials just dispensed by the dispensing heads. Tray 360 is positioned horizontally. According to the common conventions an X—Y—Z Cartesian coordinate system is selected such that the X—Y plane is parallel to tray 360. Tray 360 is preferably configured to move vertically (along the Z direction), typically downward. In various exemplary embodiments of the invention, apparatus 114 further comprises one or more leveling devices 132, e.g. a roller 326. Leveling device 326 serves to straighten, level and/or establish a thickness of the newly formed layer prior to the formation of the successive layer thereon. Leveling device 326 preferably comprises a waste collection device 136 for collecting the excess material generated during leveling. Waste collection device 136 may comprise any mechanism that delivers the material to a waste tank or waste cartridge.

In use, the dispensing heads of unit 16 move in a scanning direction, which is referred to herein as the X direction, and selectively dispense building material in a predetermined configuration in the course of their passage over tray 360. The building material typically comprises one or more types of support material and one or more types of modeling material. The passage of the dispensing heads of unit 16 is followed by the curing of the modeling material(s) by radiation source 126. In the reverse passage of the heads, back to their starting point for the layer just deposited, an additional dispensing of building material may be carried out, according to predetermined configuration. In the forward and/or reverse passages of the dispensing heads, the layer thus formed may be straightened by leveling device 326, which preferably follows the path of the dispensing heads in their forward and/or reverse movement. Once the dispensing heads return to their starting point along the X direction, they may move to another position along an indexing direction, referred to herein as the Y direction, and continue to build the same layer by reciprocal movement along the X direction. Alternately, the dispensing heads may move in the Y direction between forward and reverse movements or after more than one forward-reverse movement. The series of scans performed by the dispensing heads to complete a single layer is referred to herein as a single scan cycle.

Once the layer is completed, tray 360 is lowered in the Z direction to a predetermined Z level, according to the desired thickness of the layer subsequently to be printed. The procedure is repeated to form three-dimensional object 112 in a layerwise manner.

In another embodiment, tray 360 may be displaced in the Z direction between forward and reverse passages of the dispensing head of unit 16, within the layer. Such Z displacement is carried out in order to cause contact of the leveling device with the surface in one direction and prevent contact in the other direction.

System 110 optionally and preferably comprises a building material supply system 330, which comprises the building material containers or cartridges and supplies a plurality of building materials to fabrication apparatus 114.

A control unit 152 controls fabrication (e.g., printing) apparatus 114 and optionally and preferably also supply system 330. Control unit 152 typically includes an electronic circuit configured to perform the controlling operations. Control unit 152 preferably communicates with a data processor 154, which transmits digital data pertaining to fabrication instructions based on computer object data, e.g., a CAD configuration represented on a computer readable medium in a form of a Standard Tessellation Language (STL) format or the like. Typically, control unit 152 controls the voltage applied to each dispensing head or nozzle array and the temperature of the building material in the respective printing head or respective nozzle array, as described herein.

According to some embodiments of the present invention, control unit 152 is operated such that the temperature of the building material (uncured) does not exceed 40° C. or 35° C.

Once the manufacturing data is loaded to control unit 152 it can operate without user intervention. In some embodiments, control unit 152 receives additional input from the operator, e.g., using data processor 154 or using a user interface 116 communicating with unit 152. User interface 116 can be of any type known in the art, such as, but not limited to, a keyboard, a touch screen and the like. For example, control unit 152 can receive, as additional input, one or more building material types and/or attributes, such as, but not limited to, color, characteristic distortion and/or transition temperature, viscosity, electrical property, magnetic property. Other attributes and groups of attributes are also contemplated.

Figure 1B:
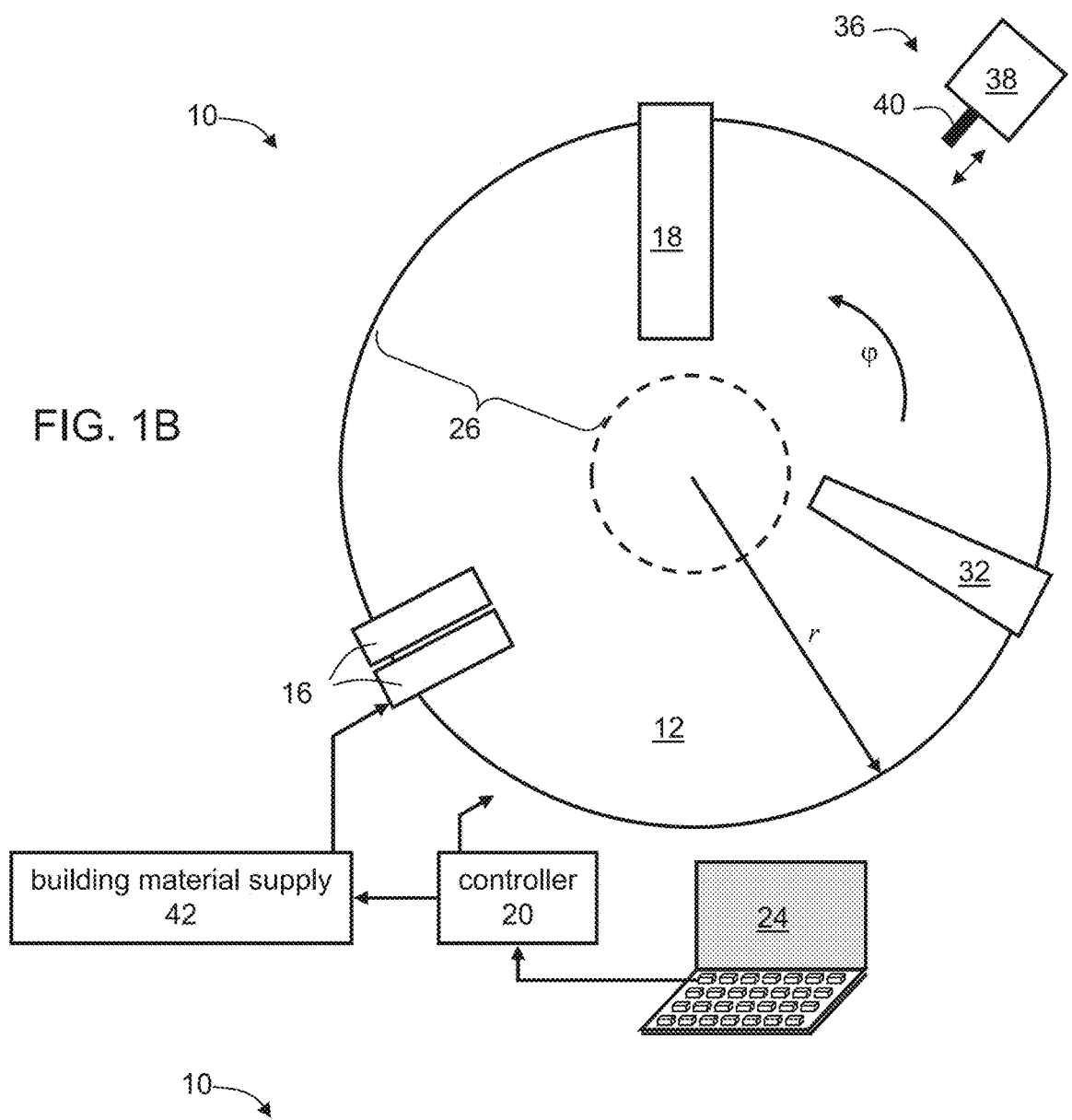
Figure 1C:
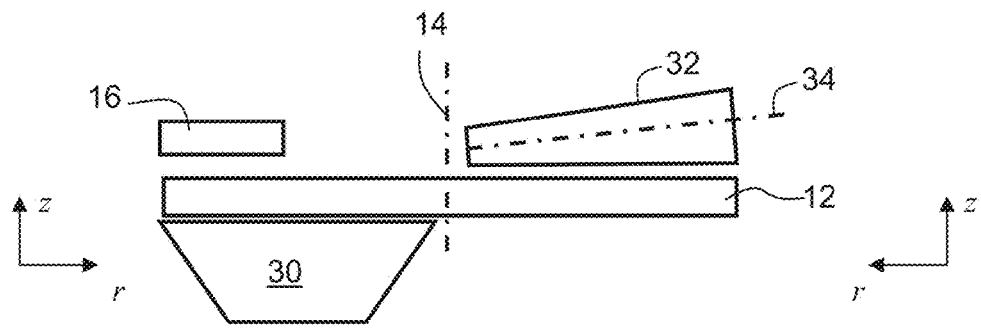
Figure 1D:
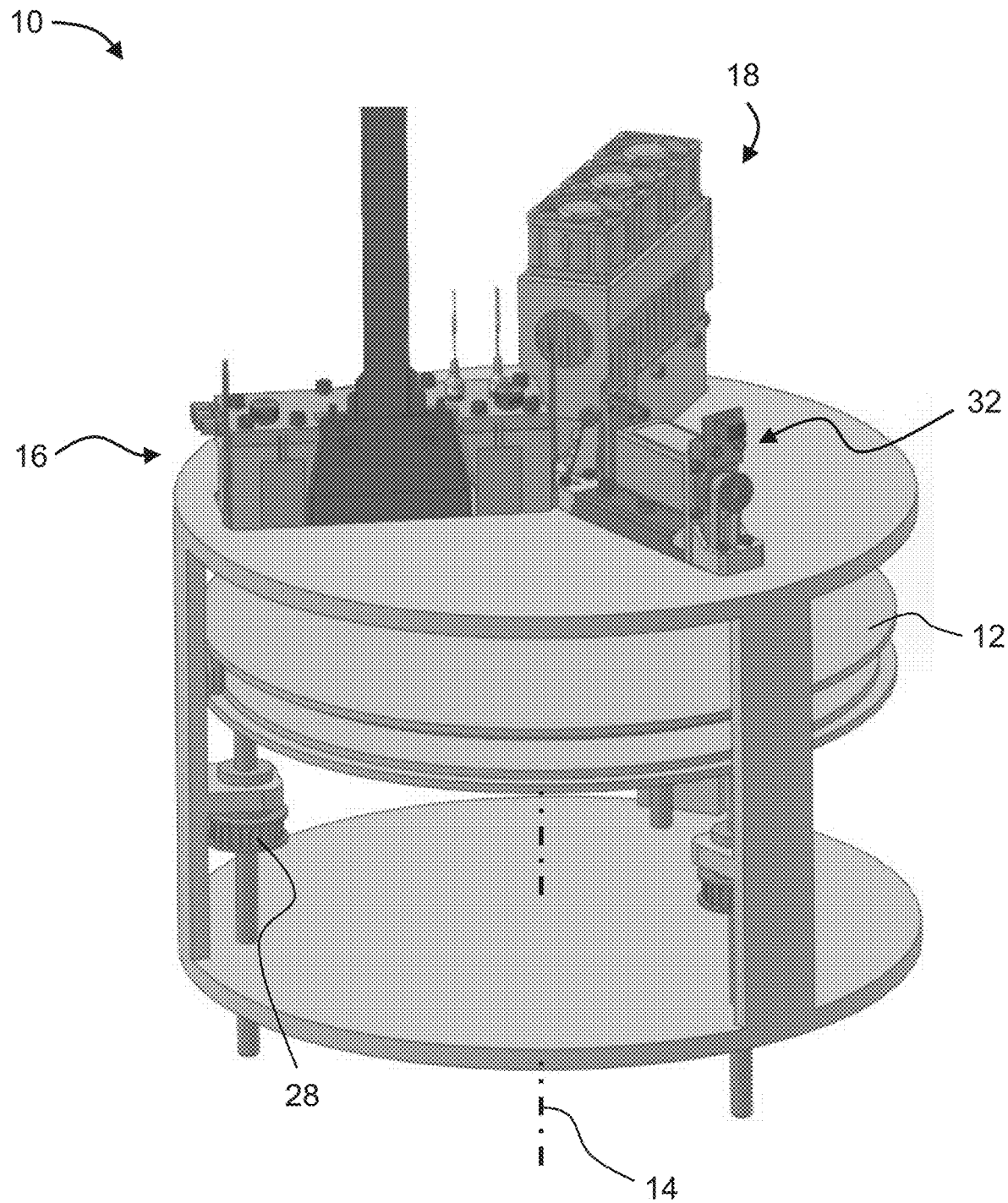

Another representative and non-limiting example of a system 10 suitable for AM of an object according to some embodiments of the present invention is illustrated in FIGS. 1B-D. FIGS. 1B-D illustrate a top view (FIG. 1B), a side view (FIG. 1C) and an isometric view (FIG. 1D) of system 10.

In the present embodiments, system 10 comprises a tray 12 and a plurality of inkjet printing heads 16, each having each having one or more arrays of nozzles with respective one or more pluralities of separated nozzles. Tray 12 can have a shape of a disk or it can be annular. Non-round shapes are also contemplated, provided they can be rotated about a vertical axis. Printing heads 16 can be any of the printing heads described above with respect to system 110.

Tray 12 and heads 16 are optionally and preferably mounted such as to allow a relative rotary motion between tray 12 and heads 16. This can be achieved by (i) configuring tray 12 to rotate about a vertical axis 14 relative to heads 16, (ii) configuring heads 16 to rotate about vertical axis 14 relative to tray 12, or (iii) configuring both tray 12 and heads 16 to rotate about vertical axis 14 but at different rotation velocities (e.g., rotation at opposite direction). While the embodiments below are described with a particular emphasis to configuration (i) wherein the tray is a rotary tray that is configured to rotate about vertical axis 14 relative to heads 16, it is to be understood that the present application contemplates also configurations (ii) and (iii). Any one of the embodiments described herein can be adjusted to be applicable to any of configurations (ii) and (iii), and one of ordinary skills in the art, provided with the details described herein, would know how to make such adjustment.

In the following description, a direction parallel to tray 12 and pointing outwardly from axis 14 is referred to as the radial direction r, a direction parallel to tray 12 and perpendicular to the radial direction r is referred to herein as the azimuthal direction $\varphi$, and a direction perpendicular to tray 12 is referred to herein is the vertical direction z.

The term "radial position," as used herein, refers to a position on or above tray 12 at a specific distance from axis 14. When the term is used in connection to a printing head, the term refers to a position of the head which is at specific distance from axis 14. When the term is used in connection to a point on tray 12, the term corresponds to any point that belongs to a locus of points that is a circle whose radius is the specific distance from axis 14 and whose center is at axis 14.

The term "azimuthal position," as used herein, refers to a position on or above tray 12 at a specific azimuthal angle relative to a predetermined reference point. Thus, radial position refers to any point that belongs to a locus of points that is a straight line forming the specific azimuthal angle relative to the reference point.

The term "vertical position," as used herein, refers to a position over a plane that intersect the vertical axis 14 at a specific point.

Tray 12 serves as a supporting structure for three-dimensional printing. The working area on which one or objects are printed is typically, but not necessarily, smaller than the total area of tray 12. In some embodiments of the present invention the working area is annular. The working area is shown at 26. In some embodiments of the present invention tray 12 rotates continuously in the same direction throughout the formation of object, and in some embodiments of the present invention tray reverses the direction of rotation at least once (e.g., in an oscillatory manner) during the formation of the object. Tray 12 is optionally and preferably removable. Removing tray 12 can be for maintenance of system 10, or, if desired, for replacing the tray before printing a new object. In some embodiments of the present invention system 10 is provided with one or more different replacement trays (e.g., a kit of replacement trays), wherein two or more trays are designated for different types of objects (e.g., different weights) different operation modes (e.g., different rotation speeds), etc. The replacement of tray 12 can be manual or automatic, as desired. When automatic replacement is employed, system 10 comprises a tray replacement device 36 configured for removing tray 12 from its position below heads 16 and replacing it by a replacement tray (not shown). In the representative illustration of FIG. 1B tray replacement device 36 is illustrated as a drive 38 with a movable arm 40 configured to pull tray 12, but other types of tray replacement devices are also contemplated.

Exemplified embodiments for the printing head 16 are illustrated in FIGS. 2A-C. These embodiments can be employed for any of the AM systems described above, including, without limitation, system 110 and system 10.

FIGS. 2A-B illustrate a printing head 16 with one (FIG. 2A) and two (FIG. 2B) nozzle arrays 22. The nozzles in the array are preferably aligned linearly, along a straight line. In embodiments in which a particular printing head has two or more linear nozzle arrays, the nozzle arrays are optionally and preferably can be parallel to each other. When a printing head has two or more arrays of nozzles (e.g., FIG. 2B) all arrays of the head can be fed with the same building material formulation, or at least two arrays of the same head can be fed with different building material formulations.

When a system similar to system 110 is employed, all printing heads 16 are optionally and preferably oriented along the indexing direction with their positions along the scanning direction being offset to one another.

When a system similar to system 10 is employed, all printing heads 16 are optionally and preferably oriented radially (parallel to the radial direction) with their azimuthal positions being offset to one another. Thus, in these embodiments, the nozzle arrays of different printing heads are not parallel to each other but are rather at an angle to each other, which angle being approximately equal to the azimuthal offset between the respective heads. For example, one head can be oriented radially and positioned at azimuthal position $\varphi_1$, and another head can be oriented radially and positioned at azimuthal position $\varphi_2$. In this example, the azimuthal offset between the two heads is $\varphi_1$-$\varphi_2$, and the angle between the linear nozzle arrays of the two heads is also $\varphi_1$-$\varphi_2$.

In some embodiments, two or more printing heads can be assembled to a block of printing heads, in which case the printing heads of the block are typically parallel to each other. A block including several inkjet printing heads 16a, 16b, 16c is illustrated in FIG. 2C.

In some embodiments, system 10 comprises a support structure 30 positioned below heads 16 such that tray 12 is between support structure 30 and heads 16. Support structure 30 may serve for preventing or reducing vibrations of tray 12 that may occur while inkjet printing heads 16 operate. In configurations in which printing heads 16 rotate about axis 14, support structure 30 preferably also rotates such that support structure 30 is always directly below heads 16 (with tray 12 between heads 16 and tray 12).

Tray 12 and/or printing heads 16 is optionally and preferably configured to move along the vertical direction z, parallel to vertical axis 14 so as to vary the vertical distance between tray 12 and printing heads 16. In configurations in which the vertical distance is varied by moving tray 12 along the vertical direction, support structure 30 preferably also moves vertically together with tray 12. In configurations in which the vertical distance is varied by heads 16 along the vertical direction, while maintaining the vertical position of tray 12 fixed, support structure 30 is also maintained at a fixed vertical position.

The vertical motion can be established by a vertical drive 28. Once a layer is completed, the vertical distance between tray 12 and heads 16 can be increased (e.g., tray 12 is lowered relative to heads 16) by a predetermined vertical step, according to the desired thickness of the layer subsequently to be printed. The procedure is repeated to form a three-dimensional object in a layerwise manner.

The operation of inkjet printing heads 16 and optionally and preferably also of one or more other components of system 10, e.g., the motion of tray 12, are controlled by a controller 20. The controller can have an electronic circuit and a non-volatile memory medium readable by the circuit, wherein the memory medium stores program instructions which, when read by the circuit, cause the circuit to perform control operations as further detailed below.

Controller 20 can also communicate with a host computer 24 which transmits digital data pertaining to fabrication instructions based on computer object data, e.g., in a form of a Standard Tessellation Language (STL) or a StereoLithography Contour (SLC) format, Virtual Reality Modeling Language (VRML), Additive Manufacturing File (AMF) format, Drawing Exchange Format (DXF), Polygon File Format (PLY) or any other format suitable for Computer-Aided Design (CAD). The object data formats are typically structured according to a Cartesian system of coordinates. In these cases, computer 24 preferably executes a procedure for transforming the coordinates of each slice in the computer object data from a Cartesian system of coordinates into a polar system of coordinates. Computer 24 optionally and preferably transmits the fabrication instructions in terms of the transformed system of coordinates. Alternatively, computer 24 can transmit the fabrication instructions in terms of the original system of coordinates as provided by the computer object data, in which case the transformation of coordinates is executed by the circuit of controller 20.

Figure 3A:
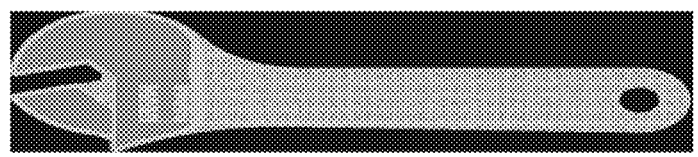
FIGS. 3A and 3B are schematic illustrations demonstrating coordinate transformations according to some embodiments of the present invention.
Figure 3B:
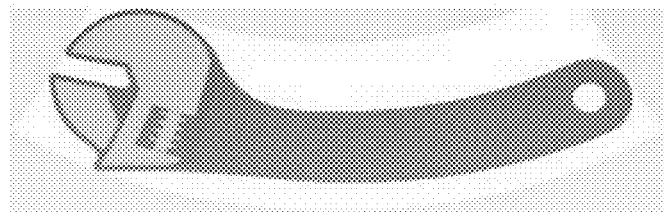

The transformation of coordinates allows three-dimensional printing over a rotating tray. In non-rotary systems with a stationary tray with the printing heads typically reciprocally move above the stationary tray along straight lines. In such systems, the printing resolution is the same at any point over the tray, provided the dispensing rates of the heads are uniform. In system 10, unlike non-rotary systems, not all the nozzles of the head points cover the same distance over tray 12 during at the same time. The transformation of coordinates is optionally and preferably executed so as to ensure equal amounts of excess material at different radial positions. Representative examples of coordinate transformations according to some embodiments of the present invention are provided in FIGS. 3A-B, showing three slices of an object (each slice corresponds to fabrication instructions of a different layer of the objects), where FIG. 3A illustrates a slice in a Cartesian system of coordinates and FIG. 3B illustrates the same slice following an application of a transformation of coordinates procedure to the respective slice.

Typically, controller 20 controls the voltage applied to the respective component of the system 10 based on the fabrication instructions and based on the stored program instructions as described below.

Generally, controller 20 controls printing heads 16 to dispense, during the rotation of tray 12, droplets of building material in layers, such as to print a three-dimensional object on tray 12.

System 10 optionally and preferably comprises one or more radiation sources 18, which can be, for example, an ultraviolet or visible or infrared lamp, or other sources of electromagnetic radiation, or electron beam source, depending on the modeling material being used. Radiation source can include any type of radiation emitting device, including, without limitation, light emitting diode (LED), digital light processing (DLP) system, resistive lamp and the like. Radiation source 18 serves for curing or solidifying the modeling material. In various exemplary embodiments of the invention the operation of radiation source 18 is controlled by controller 20 which may activate and deactivate radiation source 18 and may optionally also control the amount of radiation generated by radiation source 18.

In some embodiments of the invention, system 10 further comprises one or more leveling devices 32 which can be manufactured as a roller or a blade. Leveling device 32 serves to straighten the newly formed layer prior to the formation of the successive layer thereon. In some embodiments, leveling device 32 has the shape of a conical roller positioned such that its symmetry axis 34 is tilted relative to the surface of tray 12 and its surface is parallel to the surface of the tray. This embodiment is illustrated in the side view of system 10 (FIG. 2C).

The conical roller can have the shape of a cone or a conical frustum.

The opening angle of the conical roller is preferably selected such that there is a constant ratio between the radius of the cone at any location along its axis 34 and the distance between that location and axis 14. This embodiment allows roller 32 to efficiently level the layers, since while the roller rotates, any point p on the surface of the roller has a linear velocity which is proportional (e.g., the same) to the linear velocity of the tray at a point vertically beneath point p. In some embodiments, the roller has a shape of a conical frustum having a height h, a radius $R_1$ at its closest distance from axis 14, and a radius $R_2$ at its farthest distance from axis 14, wherein the parameters h, $R_1$ and $R_2$ satisfy the relation $R_1/R_2=(R-h)/h$ and wherein R is the farthest distance of the roller from axis 14 (for example, R can be the radius of tray 12).

The operation of leveling device 32 is optionally and preferably controlled by controller 20 which may activate and deactivate leveling device 32 and may optionally also control its position along a vertical direction (parallel to axis 14) and/or a radial direction (parallel to tray 12 and pointing toward or away from axis 14.

In some embodiments of the present invention printing heads 16 are configured to reciprocally move relative to tray along the radial direction r. These embodiments are useful when the lengths of the nozzle arrays 22 of heads 16 are shorter than the width along the radial direction of the working area 26 on tray 12. The motion of heads 16 along the radial direction is optionally and preferably controlled by controller 20.

Some embodiments contemplate the fabrication of an object by dispensing different materials from different arrays of nozzles (belonging to the same or different printing head). These embodiments provide, inter alia, the ability to select materials from a given number of materials and define desired combinations of the selected materials and their properties. According to the present embodiments, the spatial locations of the deposition of each material with the layer is defined, either to effect occupation of different three-dimensional spatial locations by different materials, or to effect occupation of substantially the same three-dimensional location or adjacent three-dimensional locations by two or more different materials so as to allow post deposition spatial combination of the materials within the layer, thereby to form a composite material at the respective location or locations.

Any post deposition combination or mix of modeling materials is contemplated. For example, once a certain material is dispensed it may preserve its original properties. However, when it is dispensed simultaneously with another modeling material or other dispensed materials which are dispensed at the same or nearby locations, a composite material having a different property or properties to the dispensed materials is formed.

Further details on the principles and operations of an AM system suitable for the present embodiments are found in U.S. Pat. No. 9,031,680, and International Publication No. WO2016/009426, the contents of which are hereby incorporated by reference.

The present embodiments thus enable the deposition of a broad range of material combinations, and the fabrication of an object which may consist of multiple different combinations of materials, in different parts of the object, according to the properties desired to characterize each part of the object.

Figure 4:
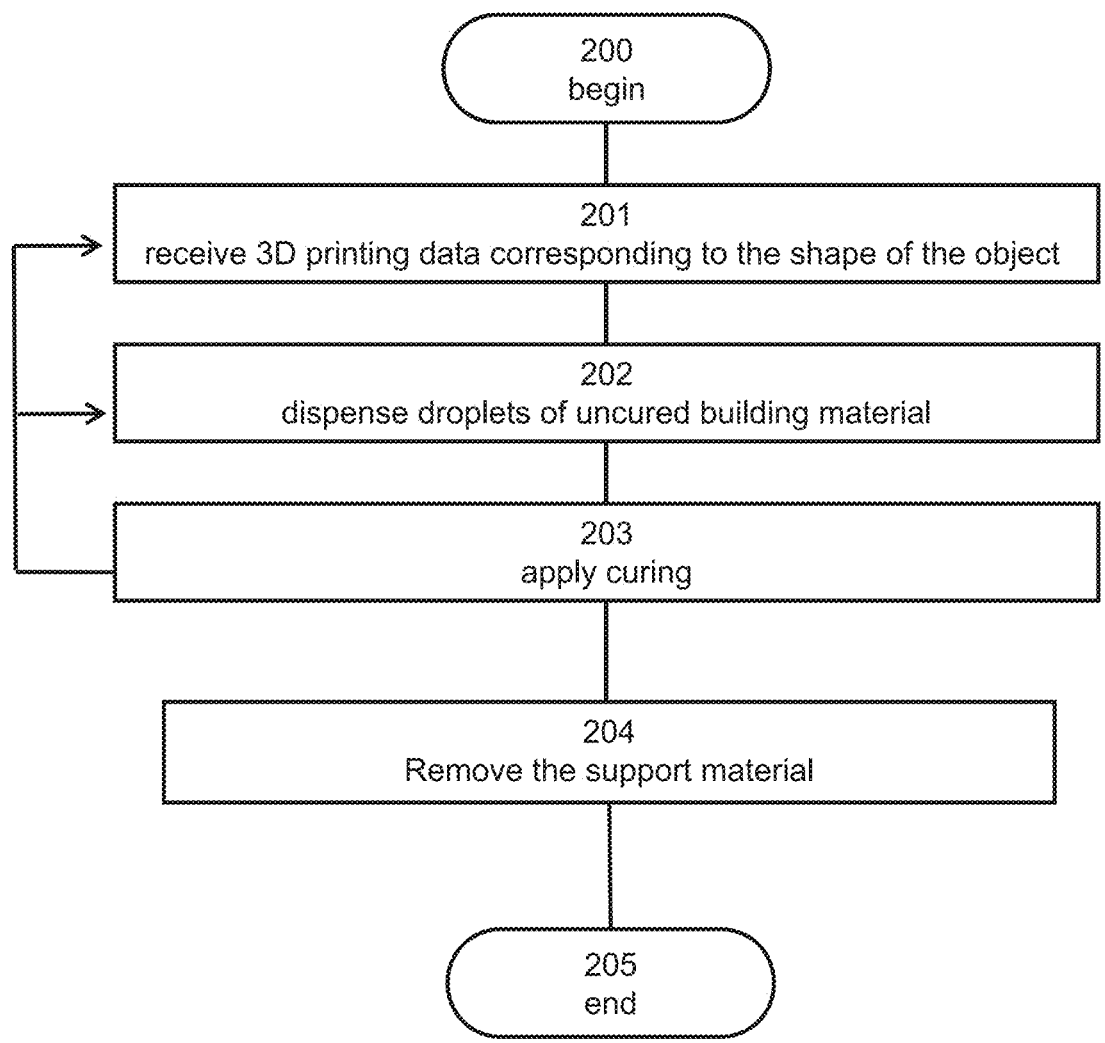
FIG. 4 is a flowchart diagram of a method suitable for AM of a three-dimensional object according to various exemplary embodiments of the present invention.

FIG. 4 is a flowchart diagram of a method suitable for AM of a three-dimensional object according to various exemplary embodiments of the present invention. It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

The method can be executed by an AM system (e.g., system 110 or system 10), preferably a 3D inkjet printing system, operated by a controller (e.g., controller 152 or 20). The method begins at 200 and optionally and preferably proceeds to 201 at which computer object data that collectively pertain to a three-dimensional shape of the object are received. The data can be received by a data processor (e.g., processor 154 or 24) operatively associated with the AM system. For example, the data processor can access a computer-readable storage medium (not shown) and retrieve the data from the medium. The data processor can also generate the data, or a portion thereof, instead of, or in addition to, retrieving data from the storage medium, for example, by means of a computer aided design (CAD) or computer aided manufacturing (CAM) software. The computer object data typically include a plurality of slice data each defining a layer of the object to be manufactured. The data processor can transfer the data, or a portion thereof, to the controller of the AM system. Typically, but not necessarily, the controller receives the data on a slice-by-slice basis.

The data can be in any data format known in the art, including, any of the aforementioned computer object data formats.

The method proceeds to 202 at which droplets of one or more modeling material formulation(s) and one or more support material formulation(s) are dispensed to form a layer in a configured pattern corresponding to a shape of a slice of the object. At least one of the support material formulations is a support material formulation as described herein in any of the respective embodiments and any combination thereof.

The dispensing 202 is optionally and preferably executed without heating the dispensing heads, the fabrication chamber and the dispensed formulation. In various exemplary embodiments of the invention the dispensing 202 is executed at a temperature that is no more than 45° C., or no more than 40° C. or no more than 35° C. When the dispensing head includes a heating device or is fed via a building material reservoir, which includes a heating device, the heating device is optionally and preferably switched off during the dispensing.

In some of any of the embodiments of the present invention, once a layer is dispensed as described herein, exposure to a curing condition (e.g., curing energy) as described herein is effected. In some embodiments, the curable materials are UV-curable materials and the curing condition is such that a radiation source emits UV radiation.

According to these embodiments, at 203 curing radiation is applied to the newly formed layer, preferably using a radiation source (e.g., device 324 or 18).

From operation 203 the method optionally and preferably loops back to 201 to receive data for another slice. When the data for the next slice is already stored within the controller, the method can loop back to 202 for form the next layer.

According to some of any of the embodiments of this aspect of the present invention, once the building material is dispensed to form a printed object and curing energy or condition is applied, the hardened (e.g., cured) support material is removed, to thereby obtain the final three-dimensional object.

According to these embodiments, at 204 the hardened support material, or a part thereof, is removed.

According to some of any of the embodiments described herein, the support material is removed by contacting the cured support material with an aqueous solution.

Contacting may be effected by means known in the art, for example, by immersing the printed object is an aqueous solution, e.g., an alkaline solution, and/or by jetting the aqueous solution onto the object. The contacting can be effected manually or in an automated manner. Any system or apparatus usable for removing a cured support material is contemplated.

In some of any of the embodiments described herein, the contacting is effected for a time period that is in correlation with the amount of the cured support material in the printed object, and the geometry thereof.

In some of any of the embodiments described herein, removal of the support material is effected by mechanical removal of the cured support material, either alone or in combination with dissolution in an aqueous solution as described herein. Any means known in the art for mechanically removing a support material are contemplated.

In some embodiments, a portion of the support material may optionally remain upon removal, for example, within a hardened mixed layer, as described herein.

In some embodiments, removal of hardened support material reveals a hardened mixed layer, comprising a hardened mixture of support material and modeling material formulation. Such a hardened mixture at a surface of an object may optionally have a relatively non-reflective appearance, also referred to herein as "matte"; whereas surfaces lacking such a hardened mixture (e.g., wherein support material formulation was not applied thereon) are described as "glossy" in comparison.

Removal the hardened support material typically depends on the solubility properties of the support material formulation.

In some embodiments, the support material formulation provides, when hardened, a material that is dissolvable in water or any other neutral aqueous solution, as described herein, and removal the hardened support material comprises immersing the plurality of dispensed layers in water, at ambient temperature, for a time period as described herein in the context of a material that is dissolvable in water. The water volume can be from 1:1 to 10:1 relative to the volume of the printed object. In some of these embodiments, immersing in water is effect without stirring or any other means for circulating the water.

In some embodiments, the support material formulation provides, when hardened, a material that is non-dissolvable in water or any other neutral aqueous solution, as described herein, and removal the support material comprises immersing the plurality of dispensed layers in an alkaline aqueous solution, at ambient temperature, and/or applying water jet, using methods known in the art.

Once an object formed of a plurality of layers is fabricated, and the support material or part thereof is removed, the method ends at 205.

In some of any of the embodiments described herein, the method further comprises exposing the cured modeling material, either before or after removal of a hardened support material, to a post-treatment condition. The post-treatment condition is typically aimed at further hardening the cured modeling material. In some embodiments, the post-treatment hardens a partially-cured material to thereby obtain a completely cured material.

In some of any of the embodiments of the present invention that relate to AM, the dispensing is effected under ambient environment.

In some embodiments, the uncured building material, or a part thereof (e.g., the support material formulation as described herein), is dispensed without prior heating, or upon heating to a temperature that does not exceed 40° C. or 35° C.

In some embodiments, dispensing the uncured building material is performed without heating the printing heads, or while heating at a temperature that does not exceed 40° C. or 35° C., while passing the uncured building material or at least the support material formulation through the nozzle of the printing head.

The curing energy or condition can be, for example, a radiation, such as an ultraviolet or visible irradiation, or other electromagnetic radiation, or electron beam radiation, depending on the building material used. The curing energy or condition applied to the dispensed layers serves for curing or solidifying or hardening the modeling material formulation and the support material formulation. Preferably, the same curing energy or condition is applied to effect curing of both the modeling materials and the support material. Alternatively, different curing energies or conditions are applied to the dispensed building material, simultaneously or sequentially, to effect curing of the modeling material formulation and the support material formulation.

According to some embodiments of each of the methods and systems described herein, the uncured building material comprises at least one support material formulation as described herein.

According to an aspect of some embodiments of the present invention, there is provided a three-dimension model object prepared by the method as described herein, in any of the embodiments thereof and any combination thereof.

According to an aspect of some embodiments of the present invention there is provided a 3D model object, fabricated by an AM method as described herein.

It is expected that during the life of a patent maturing from this application many relevant curable and non-curable materials will be developed and the scope of each of curable materials described herein is intended to include all such new technologies a priori.

As used herein the term "about" refers to ±10% or ±5%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

As used herein the term "method" or "process" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Herein throughout, the term "(meth)acrylic" encompasses acrylic and methacrylic compounds.

Herein throughout, the phrase "linking moiety" or "linking group" describes a group that connects two or more moieties or groups in a compound. A linking moiety is typically derived from a bi- or tri-functional compound, and can be regarded as a bi- or tri-radical moiety, which is connected to two or three other moieties, via two or three atoms thereof, respectively.

Exemplary linking moieties include a hydrocarbon moiety or chain, optionally interrupted by one or more heteroatoms, as defined herein, and/or any of the chemical groups listed below, when defined as linking groups.

When a chemical group is referred to herein as "end group" it is to be interpreted as a substituent, which is connected to another group via one atom thereof.

Herein throughout, the term "hydrocarbon" collectively describes a chemical group composed mainly of carbon and hydrogen atoms. A hydrocarbon can be comprised of alkyl, alkene, alkyne, aryl, and/or cycloalkyl, each can be substituted or unsubstituted, and can be interrupted by one or more heteroatoms. The number of carbon atoms can range from 2 to 20, and is preferably lower, e.g., from 1 to 10, or from 1 to 6, or from 1 to 4. A hydrocarbon can be a linking group or an end group.

Bisphenol A is an example of a hydrocarbon comprised of 2 aryl groups and one alkyl group.

As used herein, the term "amine" describes both a —NR'R" group and a —NR'— group, wherein R' and R" are each independently hydrogen, alkyl, cycloalkyl, aryl, as these terms are defined hereinbelow.

The amine group can therefore be a primary amine, where both R' and R" are hydrogen, a secondary amine, where R' is hydrogen and R" is alkyl, cycloalkyl or aryl, or a tertiary amine, where each of R' and R" is independently alkyl, cycloalkyl or aryl.

Alternatively, R' and R" can each independently be hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, carbonyl, C-carboxylate, O-carboxylate, N-thiocarbamate, O-thiocarbamate, urea, thiourea, N-carbamate, O-carbamate, C-amide, N-amide, guanyl, guanidine and hydrazine.

The term "amine" is used herein to describe a —NR'R" group in cases where the amine is an end group, as defined hereinunder, and is used herein to describe a —NR'— group in cases where the amine is a linking group or is or part of a linking moiety.

The term "alkyl" describes a saturated aliphatic hydrocarbon including straight chain and branched chain groups. Preferably, the alkyl group has 1 to 30, or 1 to 20 carbon atoms. Whenever a numerical range; e.g., "1-20", is stated herein, it implies that the group, in this case the alkyl group, may contain 1 carbon atom, 2 carbon atoms, 3 carbon atoms, etc., up to and including 20 carbon atoms. The alkyl group may be substituted or unsubstituted. Substituted alkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine.

The alkyl group can be an end group, as this phrase is defined hereinabove, wherein it is attached to a single adjacent atom, or a linking group, as this phrase is defined hereinabove, which connects two or more moieties via at least two carbons in its chain. When the alkyl is a linking group, it is also referred to herein as "alkylene" or "alkylene chain".

Herein, a C(1-4) alkyl, substituted by a hydrophilic group, as defined herein, is included under the phrase "hydrophilic group" herein.

Alkene and Alkyne, as used herein, are an alkyl, as defined herein, which contains one or more double bond or triple bond, respectively.

The term "cycloalkyl" describes an all-carbon monocyclic ring or fused rings (i.e., rings which share an adjacent pair of carbon atoms) group where one or more of the rings does not have a completely conjugated pi-electron system. Examples include, without limitation, cyclohexane, adamantine, norbornyl, isobornyl, and the like. The cycloalkyl group may be substituted or unsubstituted. Substituted cycloalkyl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The cycloalkyl group can be an end group, as this phrase is defined hereinabove, wherein it is attached to a single adjacent atom, or a linking group, as this phrase is defined hereinabove, connecting two or more moieties at two or more positions thereof.

Cycloalkyls of 1-6 carbon atoms, substituted by two or more hydrophilic groups, as defined herein, is included under the phrase "hydrophilic group" herein.

The term "heteroalicyclic" describes a monocyclic or fused ring group having in the ring(s) one or more atoms such as nitrogen, oxygen and sulfur. The rings may also have one or more double bonds. However, the rings do not have a completely conjugated pi-electron system. Representative examples are piperidine, piperazine, tetrahydrofurane, tetrahydropyrane, morpholino, oxalidine, and the like.

The heteroalicyclic may be substituted or unsubstituted. Substituted heteroalicyclic may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroalicyclic group can be an end group, as this phrase is defined hereinabove, where it is attached to a single adjacent atom, or a linking group, as this phrase is defined hereinabove, connecting two or more moieties at two or more positions thereof.

A heteroalicyclic group which includes one or more of electron-donating atoms such as nitrogen and oxygen, and in which a numeral ratio of carbon atoms to heteroatoms is 5:1 or lower, is included under the phrase "hydrophilic group" herein.

The term "aryl" describes an all-carbon monocyclic or fused-ring polycyclic (i.e., rings which share adjacent pairs of carbon atoms) groups having a completely conjugated pi-electron system. The aryl group may be substituted or unsubstituted. Substituted aryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioaryloxy, cyano, nitro, azo, sulfonamide, C-carboxylate, O-carboxylate, N-thiocarbamate, O-thiocarbamate, urea, thiourea, N-carbamate, O-carbamate, C-amide, N-amide, guanyl, guanidine and hydrazine. The aryl group can be an end group, as this term is defined hereinabove, wherein it is attached to a single adjacent atom, or a linking group, as this term is defined hereinabove, connecting two or more moieties at two or more positions thereof.

The term "heteroaryl" describes a monocyclic or fused ring (i.e., rings which share an adjacent pair of atoms) group having in the ring(s) one or more atoms, such as, for example, nitrogen, oxygen and sulfur and, in addition, having a completely conjugated pi-electron system. Examples, without limitation, of heteroaryl groups include pyrrole, furan, thiophene, imidazole, oxazole, thiazole, pyrazole, pyridine, pyrimidine, quinoline, isoquinoline and purine. The heteroaryl group may be substituted or unsubstituted. Substituted heteroaryl may have one or more substituents, whereby each substituent group can independently be, for example, hydroxyalkyl, trihaloalkyl, cycloalkyl, alkenyl, alkynyl, aryl, heteroaryl, heteroalicyclic, amine, halide, sulfonate, sulfoxide, phosphonate, hydroxy, alkoxy, aryloxy, thiohydroxy, thioalkoxy, thioaryloxy, cyano, nitro, azo, sulfonamide, C-carboxylate, O-carboxylate, N-thiocarbamate, O-thiocarbamate, urea, thiourea, O-carbamate, N-carbamate, C-amide, N-amide, guanyl, guanidine and hydrazine. The heteroaryl group can be an end group, as this phrase is defined hereinabove, where it is attached to a single adjacent atom, or a linking group, as this phrase is defined hereinabove, connecting two or more moieties at two or more positions thereof. Representative examples are pyridine, pyrrole, oxazole, indole, purine and the like.

The term "halide" and "halo" describes fluorine, chlorine, bromine or iodine.

The term "haloalkyl" describes an alkyl group as defined above, further substituted by one or more halide.

The term "sulfate" describes a —O—S(=O)$_2$—OR' end group, as this term is defined hereinabove, or an —O—S(=O)$_2$—O— linking group, as these phrases are defined hereinabove, where R' is as defined hereinabove.

The term "thiosulfate" describes a —O—S(=S)(=O)—OR' end group or a —O—S(=S)(=O)—O— linking group, as these phrases are defined hereinabove, where R' is as defined hereinabove.

The term "sulfite" describes an —O—S(=O)—O—R' end group or a —O—S(=O)—O— group linking group, as these phrases are defined hereinabove, where R' is as defined hereinabove.

The term "thiosulfite" describes a —O—S(=S)—O—R' end group or an —O—S(=S)—O— group linking group, as these phrases are defined hereinabove, where R' is as defined hereinabove.

The term "sulfinate" describes a —S(=O)—OR' end group or an —S(=O)—O— group linking group, as these phrases are defined hereinabove, where R' is as defined hereinabove.

The term "sulfoxide" or "sulfinyl" describes a —S(=O)R' end group or an —S(=O)— linking group, as these phrases are defined hereinabove, where R' is as defined hereinabove.

The term "sulfonate" describes a —S(=O)$_2$—R' end group or an —S(=O)$_2$— linking group, as these phrases are defined hereinabove, where R' is as defined herein.

The term "S-sulfonamide" describes a —S(=O)$_2$—NR'R" end group or a —S(=O)$_2$—NR'-linking group, as these phrases are defined hereinabove, with R' and R" as defined herein.

The term "N-sulfonamide" describes an R'S(=O)$_2$—NR"— end group or a —S(=O)$_2$—NR'— linking group, as these phrases are defined hereinabove, where R' and R" are as defined herein.

The term "disulfide" refers to a —S—SR' end group or a —S—S— linking group, as these phrases are defined hereinabove, where R' is as defined herein.

The term "phosphonate" describes a —P(=O)(OR')(OR") end group or a —P(=O)(OR')(O)— linking group, as these phrases are defined hereinabove, with R' and R" as defined herein.

The term "thiophosphonate" describes a —P(=S)(OR')(OR") end group or a —P(=S)(OR')(O)— linking group, as these phrases are defined hereinabove, with R' and R" as defined herein.

The term "phosphinyl" describes a —PR'R" end group or a —PR'— linking group, as these phrases are defined hereinabove, with R' and R" as defined hereinabove.

The term "phosphine oxide" describes a —P(=O)(R')(R") end group or a —P(=O)(R')— linking group, as these phrases are defined hereinabove, with R' and R" as defined herein.

The term "phosphine sulfide" describes a —P(=S)(R')(R") end group or a —P(=S)(R')— linking group, as these phrases are defined hereinabove, with R' and R" as defined herein.

The term "phosphite" describes an —O—PR'(=O)(OR") end group or an —O—PH(=O)(O)— linking group, as these phrases are defined hereinabove, with R' and R" as defined herein.

The term "carbonyl" or "carbonate" as used herein, describes a —C(=O)—R' end group or a —C(=O)— linking group, as these phrases are defined hereinabove, with R' as defined herein.

The term "thiocarbonyl" as used herein, describes a —C(=S)—R' end group or a —C(=S)— linking group, as these phrases are defined hereinabove, with R' as defined herein.

The term "oxo" as used herein, describes a (=O) group, wherein an oxygen atom is linked by a double bond to the atom (e.g., carbon atom) at the indicated position.

The term "thiooxo" as used herein, describes a (=S) group, wherein a sulfur atom is linked by a double bond to the atom (e.g., carbon atom) at the indicated position.

The term "oxime" describes a =N—OH end group or a =N—O— linking group, as these phrases are defined hereinabove.

The term "hydroxyl" describes a —OH group.

The term "alkoxy" describes both an —O-alkyl and an —O-cycloalkyl group, as defined herein.

The term "aryloxy" describes both an —O-aryl and an —O-heteroaryl group, as defined herein.

The term "thiohydroxy" describes a —SH group.

The term "thioalkoxy" describes both a —S-alkyl group, and a —S-cycloalkyl group, as defined herein.

The term "thioaryloxy" describes both a —S-aryl and a —S-heteroaryl group, as defined herein.

The "hydroxyalkyl" is also referred to herein as "alcohol", and describes an alkyl, as defined herein, substituted by a hydroxy group.

The term "cyano" describes a —C≡N group.

The term "isocyanate" describes an —N=C=O group.

The term "isothiocyanate" describes an —N=C=S group.

The term "nitro" describes an —NO$_2$ group.

The term "acyl halide" describes a —(C=O)R"" group wherein R"" is halide, as defined hereinabove.

The term "azo" or "diazo" describes an —N=NR' end group or an —N=N— linking group, as these phrases are defined hereinabove, with R' as defined hereinabove.

The term "peroxo" describes an —O—OR' end group or an —O—O— linking group, as these phrases are defined hereinabove, with R' as defined hereinabove.

The term "carboxylate" as used herein encompasses C-carboxylate and O-carboxylate. The term "C-carboxylate" describes a —C(=O)—OR' end group or a —C(=O)—O— linking group, as these phrases are defined hereinabove, where R' is as defined herein.

The term "O-carboxylate" describes a —OC(=O)R' end group or a —OC(=O)— linking group, as these phrases are defined hereinabove, where R' is as defined herein.

A carboxylate can be linear or cyclic. When cyclic, R' and the carbon atom are linked together to form a ring, in C-carboxylate, and this group is also referred to as lactone. Alternatively, R' and O are linked together to form a ring in O-carboxylate. Cyclic carboxylates can function as a linking group, for example, when an atom in the formed ring is linked to another group.

The term "thiocarboxylate" as used herein encompasses C-thiocarboxylate and O-thiocarboxylate.

The term "C-thiocarboxylate" describes a —C(=S)—OR' end group or a —C(=S)—O— linking group, as these phrases are defined hereinabove, where R' is as defined herein.

The term "0-thiocarboxylate" describes a —OC(=S)R' end group or a —OC(=S)— linking group, as these phrases are defined hereinabove, where R' is as defined herein.

A thiocarboxylate can be linear or cyclic. When cyclic, R' and the carbon atom are linked together to form a ring, in C-thiocarboxylate, and this group is also referred to as thiolactone. Alternatively, R' and O are linked together to form a ring in O-thiocarboxylate. Cyclic thiocarboxylates can function as a linking group, for example, when an atom in the formed ring is linked to another group.

The term "carbamate" as used herein encompasses N-carbamate and O-carbamate.

The term "N-carbamate" describes an R"OC(=O)—NR'— end group or a —OC(=O)—NR'-linking group, as these phrases are defined hereinabove, with R' and R" as defined herein.

The term "O-carbamate" describes an —OC(=O)—NR'R" end group or an —OC(=O)—NR'— linking group, as these phrases are defined hereinabove, with R' and R" as defined herein.

A carbamate can be linear or cyclic. When cyclic, R' and the carbon atom are linked together to form a ring, in O-carbamate. Alternatively, R' and O are linked together to form a ring in N-carbamate. Cyclic carbamates can function as a linking group, for example, when an atom in the formed ring is linked to another group.

The term "carbamate" as used herein encompasses N-carbamate and O-carbamate.

The term "thiocarbamate" as used herein encompasses N-thiocarbamate and O-thiocarbamate.

The term "O-thiocarbamate" describes a —OC(=S)—NR'R" end group or a —OC(=S)—NR'— linking group, as these phrases are defined hereinabove, with R' and R" as defined herein.

The term "N-thiocarbamate" describes an R"OC(=S)NR'— end group or a —OC(=S)NR'-linking group, as these phrases are defined hereinabove, with R' and R" as defined herein.

Thiocarbamates can be linear or cyclic, as described herein for carbamates.

The term "dithiocarbamate" as used herein encompasses S-dithiocarbamate and N-dithiocarbamate.

The term "S-dithiocarbamate" describes a —SC(=S)—NR'R" end group or a —SC(=S)NR'— linking group, as these phrases are defined hereinabove, with R' and R" as defined herein.

The term "N-dithiocarbamate" describes an R"SC(=S)NR'— end group or a —SC(=S)NR'— linking group, as these phrases are defined hereinabove, with R' and R" as defined herein.

The term "urea", which is also referred to herein as "ureido", describes a —NR'C(=O)—NR"R'" end group or a —NR'C(=O)—NR"— linking group, as these phrases are defined hereinabove, where R' and R" are as defined herein and R'" is as defined herein for R' and R".

The term "thiourea", which is also referred to herein as "thioureido", describes a —NR'—C(=S)—NR"R'" end group or a —NR'—C(=S)—NR"— linking group, with R', R" and R'" as defined herein.

The term "amide" as used herein encompasses C-amide and N-amide.

The term "C-amide" describes a —C(=O)—NR'R" end group or a —C(=O)—NR'— linking group, as these phrases are defined hereinabove, where R' and R" are as defined herein.

The term "N-amide" describes a R'C(=O)—NR"— end group or a R'C(=O)—N— linking group, as these phrases are defined hereinabove, where R' and R" are as defined herein.

An amide can be linear or cyclic. When cyclic, R' and the carbon atom are linked together to form a ring, in C-amide, and this group is also referred to as lactam. Cyclic amides can function as a linking group, for example, when an atom in the formed ring is linked to another group.

The term "guanyl" describes a R'R"NC(=N)— end group or a —R'NC(=N)— linking group, as these phrases are defined hereinabove, where R' and R" are as defined herein.

The term "guanidine" describes a —R'NC(=N)—NR"R'" end group or a —R'NC(=N)—NR"— linking group, as these phrases are defined hereinabove, where R', R" and R'" are as defined herein.

The term "hydrazine" describes a —NR'—NR"R'" end group or a —NR'—NR"— linking group, as these phrases are defined hereinabove, with R', R", and R'" as defined herein.

As used herein, the term "hydrazide" describes a —C(=O)—NR'—NR"R'" end group or a —C(=O)—NR'—NR"— linking group, as these phrases are defined hereinabove, where R', R" and R'" are as defined herein.

As used herein, the term "thiohydrazide" describes a —C(=S)—NR'—NR"R'" end group or a —C(=S)—NR'—NR"— linking group, as these phrases are defined hereinabove, where R', R" and R'" are as defined herein.

As used herein, the term "alkylene glycol" describes a —O—[(CR'R")$_z$—O]$_y$R'" end group or a —O—[(CR'R")$_z$—O]$_y$— linking group, with R', R" and R'" being as defined herein, and with z being an integer of from 1 to 10, preferably, from 2 to 6, more preferably 2 or 3, and y being an integer of 1 or more. Preferably R' and R" are both hydrogen. When z is 2 and y is 1, this group is ethylene glycol. When z is 3 and y is 1, this group is propylene glycol. When y is 2-4, the alkylene glycol is referred to herein as oligo(alkylene glycol).

When y is greater than 4, the alkylene glycol is referred to herein as poly(alkylene glycol). In some embodiments of the present invention, a poly(alkylene glycol) group or moiety can have from 10 to 200 repeating alkylene glycol units, such that z is 10 to 200, preferably 10-100, more preferably 10-50.

The term "silanol" describes a —Si(OH)R'R" group, or —Si(OH)$_2$R' group or —Si(OH)$_3$ group, with R' and R" as described herein.

The term "silyl" describes a —SiR'R"R'" group, with R', R" and R'" as described herein.

As used herein, the term "urethane" or "urethane moiety" or "urethane group" describes a Rx-O—C(=O)—NR'R" end group or a -Rx-O—C(=O)—NR'— linking group, with R' and R" being as defined herein, and Rx being an alkyl, cycloalkyl, aryl, alkylene glycol or any combination thereof. Preferably R' and R" are both hydrogen.

The term "polyurethane" or "oligourethane" describes a moiety that comprises at least one urethane group as described herein in the repeating backbone units thereof, or at least one urethane bond, —O—C(=O)—NR'—, in the repeating backbone units thereof.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

Materials and Experimental Methods 3D inkjet printing experiments were performed using either an Objet30™, an Objet Eden260VS™, or a J750™ printing systems (Stratasys Ltd., Israel), in either single mode or digital mode, at jetting temperatures that do not exceed 40-42° C.

All reagents and materials composing the tested formulations were obtained from known vendors.

Viscosity was measured on Brookfield viscometer at 25-45° C.

Example 1

Support Material Formulations Design

The present inventors have conducted extensive studies, during a few years, in a search for support material formulations that can be used in 3D inkjet printing methodologies at jetting temperatures that do not exceed 40° C., and preferably do not exceed 35° C.

As discussed herein, currently available formulations feature a viscosity that meets the requirements of 3D inkjet printing systems, that is, a viscosity in the range of from 8 cPs to about 30 cPs, only at elevated temperatures of at least 50° C., usually in the range of 50-90° C., typically at 70° C.

The present inventors have studied the effect of numerous modifications of support formulations currently used in 3D inkjet printing on the formulation's viscosity at low temperatures and on the formulation's stability and the mechanical properties of the hardened material formed of the formulation, and have designed, based on these studies, support material formulations that feature the required viscosity at the target low temperatures.

Support material formulations featuring a viscosity of up to 50 cPs, typically up to 20 cPs, at 20-35° C., which provide hardened materials that feature variable swelling and solubility properties, similarly to currently available support formulations, were designed.

More specifically, the present inventors have designed formulations which were aimed at providing swelling and/or solubility properties similar to formulations marketed by Stratasys Ltd. (Israel) as SUP705™, SUP706™ and SUP707™, yet are jettable at lower temperatures (i.e. at jetting temperatures that do not exceed 40° C.). The designed formulations indeed feature swelling and solubility properties similar to the currently available formulations and some even feature improved solubility properties, by being dissolvable in an aqueous solution without a need of pressure and/or alkaline conditions.

The designed support material formulations include water-soluble monofunctional curable materials, optionally water-soluble multifunctional curable materials, and non-curable components such as water and/or polymeric materials featuring low viscosity, which are typically selected so as to swell or dissolve the hardened material formed of the curable materials. The designed formulations feature reactivity and mechanical properties required for a support material, and solubility required for a facilitated removal upon curing.

Example 2

Non-Soluble Support Material Formulations

Table 1 below presents the chemical composition of an exemplary support material formulation suitable for forming a support material which is similar in its properties to SUP706™, that is, is dissolvable upon application of water jet. This formulation is also referred to herein as providing a hardened material that is non-dissolvable in water.

TABLE 1

| Component | Exemplary Materials | Percentage (%) |
|---|---|---|
| Water soluble Monofunctional hydrophilic curable material | Poly(ethylene glycol) acrylate (e.g., PEA-6; CAS No. 26403-58-7) | 20-25 |
| Water | | 20-40 |
| Non-curable material(s) | 1,2-Propanediol (Propylene glycol) 1,2,3-Propanetriol (Glycerol) Polypropylene glycol (e.g., PPG600) Polyethylene glycol (e.g., PEG400) Propylene carbonate (CAS No. 108-32-7) | 40-60 |

TABLE 1-continued

| Component | Exemplary Materials | Percentage (%) |
|---|---|---|
| Photoinitiator | BAPO type (Bis Acyl Phosphine Oxide) Alpha Hydroxy ketone MAPO (Monoacylphosphine oxides) | <1 |
| Surfactant/ Dispersant | BYK Type (PDMS derivatives) | 0-1 |
| Inhibitor | MEHQ Genorad Type | 0.01-1 |

An exemplary composition according to these embodiments is also referred to as B-14. In this composition, the non-curable material comprises glycerol, at a concentration of 5-10 weight percents and propylene glycol at a concentration of 35-45 weight percents.

The present inventors have uncovered that higher amounts of non-curable materials which have high swelling capacity for the hardened material formed of the curable material(s) allow using relatively low concentration of the curable materials and further increases the reactivity of the formulation and allow reducing the amount of a photoinitiator to below 1% by weight.

Table 2 below presents the chemical composition of an exemplary support material formulation suitable for forming a non-soluble support material that is removable upon application of mechanical means, similarly to SUP705™. This formulation is also referred to herein as providing a hardened material that is non-dissolvable in water.

TABLE 2

| Component | Exemplary Materials | Percentage (%) |
|---|---|---|
| Water soluble Monofunctional hydrophilic curable material(s) | Poly(ethylene glycol) acrylate (e.g., PEA-6; CAS No. 26403-58-7) CN550 (amine modified polyether triacrylate oligomer) | 25-30 |
| Non-curable material(s) | 1,2-Propanediol (Propylene glycol) 1,2,3-Propanetriol (Glycerol) Polypropylene glycol (e.g., PPG600) Polyethylene glycol (e.g., PEG400) Propylene carbonate (CAS No. 108-32-7) Polyol 3165 | 60-80 |
| Photoinitiator | BAPO type (Bis Acyl Phosphine Oxide) Alpha Hydroxy ketone MAPO (Monoacylphosphine oxides) | 1-3 (e.g., 2) |
| Surfactant/ Dispersant | BYK Type (PDMS derivatives) | 0-1 |
| Inhibitor | MEHQ Genorad Type | 0.01-1 |

An exemplary composition according to these embodiments is also referred to as A-3. In this composition, the curable materials comprise monofunctional and trifunctional hydrophilic curable materials at a weight ratio of about 5:2, to thereby increase the formulation's reactivity.

Example 3

Soluble Formulations

By "Soluble Support formulations" it is generally meant formulations that provide, when hardened, a material that is dissolvable upon immersion in an aqueous solution, without the need to use water pressure and/or other mechanical means for removing it from the model object.

The present inventors have designed additional formulations, which were aimed at performing similarly to SUP707™. This formulation is also referred to herein as providing a hardened material that is dissolvable in water.

The chemical compositions of such formulations are collectively presented in Table 3 below.

TABLE 3

| Component | Exemplary Materials | Percentage (%) |
|---|---|---|
| Water soluble Monofunctional hydrophilic curable material(s) | ACMO (Acryloyl Morpholine; CAS No. 5117-12-4) | 25-35 |
| Non-curable material(s) | 1,2-Propanediol (Propylene glycol) 1,2,3-Propanetriol (Glycerol) Polypropylene glycol (e.g., PPG600) Polyethylene glycol (e.g., PEG400) Propylene carbonate (CAS No. 108-32-7) Polyol 3165 DPGMEA (Di(propylene glycol) methyl ether acetate; CAS No. 88917-22-0) | 60-80 |
| Photoinitiator | BAPO type (Bis Acyl Phosphine Oxide) Alpha Hydroxy ketone MAPO (Monoacylphosphine oxides) | 1-3 (e.g., 1.5) |
| Surfactant/ Dispersant | BYK Type (PDMS derivatives) | 0-1 |
| Inhibitor | MEHQ Genorad Type | 0.01-1 |

Exemplary formulations are also referred to as R-54E and R-57E, and include PPG600 (at e.g., 35-45% by weight) and DPGMEA (e.g., at 15-35% by weight) as the major components of the non-curable materials, with the latter included to increase swelling of the hardened material provided by ACMO.

FIG. 5 presents a series of photographs showing the dissolution of a hardened support material from a cathedral-shaped printed object having general dimensions of 60×30×30 mm, and made of support formulation R-54E, at a matte mode as described herein. The printed object was immersed in tap water at room temperature, without stirring. As shown in FIG. 5, complete dissolution of the hardened support material was effected in about 3 hours and 30 minutes (210 minutes).

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A support material formulation usable in additive manufacturing of a three-dimensional object, the formulation comprising:
    at least one hydrophilic curable material which provides, when hardened, a material that is dissolvable or swellable in an aqueous solution, in an amount of from 20 to 25 weight percent of the total weight of the formulation; and
    at least one non-curable material in an amount of from 65 to 80 weight percent of the total weight of the formulation,
    wherein said at least one curable material comprises a monofunctional hydrophilic curable material and a multifunctional hydrophilic curable material, wherein a weight ratio of said monofunctional and multifunctional curable materials ranges from 2:1 to 5:1, and wherein said monofunctional curable material comprises a poly (alkylene glycol) acrylate, and said multifunctional curable material comprises a polyether urethane di- or tri-acrylate, and said at least one non-curable material comprises propylene carbonate, such that a swelling capacity of said hardened material for said at least non-curable material or for a mixture of said at least non-curable material and water, if present, is of at least 70% by weight of a weight of said hardened material,
    the formulation featuring a viscosity of no more than 50 cPs at 35° C.

2. The formulation of claim 1, further comprising a photoinitiator, wherein an amount of said photoinitiator ranges from 1 to 3% by weight, of the total weight of the formulation.

3. A method of fabricating a three-dimensional object, the method comprising:
    receiving three-dimensional printing data corresponding to the shape of the object;
    dispensing droplets of uncured building material in layers, on a receiving medium, using at least one inkjet printing head, according to said printing data,
    said uncured building material comprising at least one modeling material formulation and at least one support material formulation, said support material formulation being a formulation according to claim 1,
    wherein a temperature of said at least one inkjet printing head is no more than 35° C.

4. The method of claim 3, wherein said at least one modeling material formulation features a viscosity of no more than 50 cPs at 35° C.

5. The support material formulation of claim 1, wherein said additive manufacturing is 3D inkjet printing.

6. The support material formulation of claim 1, wherein an amount of said propylene carbonate is at least 40% by weight of the total weight of the formulation.

7. The support material formulation of claim 1, wherein said non-curable material comprises a mixture of propylene carbonate and a polyol.

8. The support material formulation of claim 7, wherein a weight ratio of said propylene carbonate and a polyol ranges from 1:1 to 3:1.

9. The support material formulation of claim 1, wherein said poly (alkylene glycol) acrylate is or comprises hexa (ethylene glycol) acrylate (6-PEA).

10. The support material formulation of claim 1, wherein said polyether urethane di- or tri-acrylate further features amine groups.

11. The method of claim 3, wherein said additive manufacturing is 3D inkjet printing.

12. The method of claim 3, wherein an amount of said propylene carbonate is at least 40% by weight of the total weight of the support material formulation.

13. The method of claim 3, wherein said non-curable material comprises a mixture of propylene carbonate and a polyol.

14. The method of claim 13, wherein a weight ratio of said propylene carbonate and a polyol ranges from 1:1 to 3:1.

15. The method of claim 3, wherein said poly (alkylene glycol) acrylate is or comprises hexa (ethylene glycol) acrylate (6-PEA).

16. The method of claim 3, wherein said polyether urethane di- or tri-acrylate further features amine groups.

17. The method of claim 3, wherein said support material formulation further comprises a photoinitiator.

18. The method of claim 17, wherein an amount of said photoinitiator ranges from 1 to 3% by weight, of the total weight of the support material formulation.

* * * * *